US012565602B2

(12) United States Patent
Mori et al.

(10) Patent No.: US 12,565,602 B2
(45) Date of Patent: Mar. 3, 2026

(54) HIGH-FREQUENCY DIELECTRIC HEATING ADHESIVE SHEET

(71) Applicant: LINTEC CORPORATION, Tokyo (JP)

(72) Inventors: Yuichi Mori, Tokyo (JP); Naoki Taya, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 707 days.

(21) Appl. No.: 17/915,062

(22) PCT Filed: Mar. 26, 2021

(86) PCT No.: PCT/JP2021/012958
§ 371 (c)(1),
(2) Date: Sep. 27, 2022

(87) PCT Pub. No.: WO2021/200686
PCT Pub. Date: Oct. 7, 2021

(65) Prior Publication Data
US 2023/0141072 A1    May 11, 2023

(30) Foreign Application Priority Data
Mar. 31, 2020    (JP) ................................. 2020-063528

(51) Int. Cl.
*C09J 7/35*        (2018.01)
*C08K 3/14*        (2006.01)
(Continued)

(52) U.S. Cl.
CPC ................. *C09J 7/35* (2018.01); *C09J 11/04* (2013.01); *C09J 123/00* (2013.01); *C09J 123/04* (2013.01);
(Continued)

(58) Field of Classification Search
None
See application file for complete search history.

(56) References Cited

U.S. PATENT DOCUMENTS 11,541,607 B2 *  1/2023  Ishikawa ................ C09J 129/14
11,542,415 B2 *  1/2023  Ishikawa .................. C09J 11/04
(Continued)

FOREIGN PATENT DOCUMENTS

EP          3333234 A1    6/2018
EP          4129657 A1    2/2023
(Continued)

OTHER PUBLICATIONS

Machine translation of JP 2017210558 A (Year: 2017).*
(Continued)

*Primary Examiner* — Frank D Ducheneaux
(74) *Attorney, Agent, or Firm* — Rimon P.C.

(57)        ABSTRACT

A        high-frequency-dielectric-heating-adhesive-sheet includes: a first adhesive layer containing a first thermoplastic resin; a second adhesive layer containing a second thermoplastic resin; and an intermediate layer, a ratio DPM/DP1 of dielectric property DPM of the intermediate layer to dielectric property DP1 of the first adhesive layer and a ratio DPM/DP2 of the dielectric property DPM of the intermediate layer to dielectric property DP2 of the second adhesive layer are each less than one, and the dielectric property DP1, the dielectric property DP2, and the dielectric property DPM are values of dielectric property (tan$\delta$/$\varepsilon$'r) of the first adhesive layer, the second adhesive layer, and the intermediate layer, respectively. tan$\delta$ denotes a dielectric dissipation factor at 23 degrees C. and a frequency of 40.68 MHz and $\varepsilon$'r denotes a relative permittivity at 23 degrees C. and the frequency of 40.68 MHz.

13 Claims, 4 Drawing Sheets

(51) Int. Cl.

| | |
|---|---|
| *C08K 3/22* | (2006.01) |
| *C09J 11/04* | (2006.01) |
| *C09J 123/00* | (2006.01) |
| *C09J 123/04* | (2006.01) |
| *C09J 123/10* | (2006.01) |

(52) U.S. Cl.
CPC ......... *C09J 123/10* (2013.01); *B32B 2250/03* (2013.01); *B32B 2310/12* (2013.01); *C08K 3/14* (2013.01); *C08K 2003/2296* (2013.01); *C09J 2301/124* (2020.08); *C09J 2301/208* (2020.08); *C09J 2301/304* (2020.08); *C09J 2301/312* (2020.08); *C09J 2301/408* (2020.08); *C09J 2301/41* (2020.08); *C09J 2423/00* (2013.01)

(56) References Cited

U.S. PATENT DOCUMENTS

| | | | |
|---|---|---|---|
| 2019/0352546 A1* | 11/2019 | Taya .......................... C08J 7/18 |
| 2020/0010730 A1* | 1/2020 | Taya .......................... C09J 7/35 |

FOREIGN PATENT DOCUMENTS

| | | | | | |
|---|---|---|---|---|---|
| EP | 4129663 | A1 | 2/2023 | | |
| EP | 4130181 | A1 | 2/2023 | | |
| JP | S50-29738 | B2 | 9/1975 | | |
| JP | S58-174474 | A | 10/1983 | | |
| JP | H08-258173 | A | 10/1996 | | |
| JP | H08-281873 | A | 10/1996 | | |
| JP | H10-17837 | A | 1/1998 | | |
| JP | 2009-538971 | A | 11/2009 | | |
| JP | 2011-514852 | A | 5/2011 | | |
| JP | 2014-37489 | A | 2/2014 | | |
| JP | 2017-88764 | A | 5/2017 | | |
| JP | 2017210558 | A | * 11/2017 | | |
| JP | 2018177825 | A | * 11/2018 | ............... | C09J 5/06 |
| WO | 2007/105602 | A1 | 9/2007 | | |
| WO | WO-2018079356 | A1 | * 5/2018 | ............... | C09J 7/10 |
| WO | 2018/186297 | A1 | 10/2018 | | |

OTHER PUBLICATIONS

Machine translation of JP2018177825A (Year: 2018).*
Machine translation of JP 2014037489 A (Year: 2014).*
Extended European Search Report issued in corresponding European Patent Application No. 21781182.7, dated Apr. 17, 2024.
First Office Action issued in corresponding Chinese Patent Application No. 202180026518.0, dated Jan. 8, 2024.
English translation of the International Preliminary Report on Patentability issued in corresponding International Patent Application No. PCT/JP2021/012958, dated Sep. 29, 2022.
International Search Report issued in corresponding International Patent Application No. PCT/JP2021/012958, dated Jun. 15, 2021, with English translation.

* cited by examiner

HIGH-FREQUENCY DIELECTRIC HEATING ADHESIVE SHEET

CROSS REFERENCE TO RELATED APPLICATIONS

This patent application is the U.S. National Phase under 35 U.S.C. § 371 of International Application No. PCT/JP2021/012958, filed on Mar. 26, 2021, which claims the benefit of Japanese Patent Application No. 2020-063528, dated Mar. 31, 2020, the entire contents of each are hereby incorporated by reference in their entirety.

TECHNICAL FIELD

The present invention relates to a high-frequency dielectric heating adhesive sheet.

BACKGROUND ART

For instance, a method including performing a dielectric heating treatment, an induction heating treatment, a supersonic welding treatment, a laser welding treatment, or the like with an adhesive agent interposed between adherends has recently been proposed as a method of bonding adherends usually unlikely to be bonded, the adhesive agent being made by blending a heat-generating material in a predetermined resin.

For instance, Patent Literature 1 describes a sheet-shaped heat-sensitive adhesive agent made by blending a fine powder of at least one selected from the group consisting of carbon black, silicon oxide, metal, and metal oxide.

CITATION LIST

Patent Literature(S)

Patent Literature 1: JP 58-174474 A

SUMMARY OF THE INVENTION

Problem(s) to be Solved by the Invention

The heat-sensitive adhesive agent described in Patent Literature 1 is in the form of a single-layer sheet meltable by dielectric heating. In a case where the single-layer sheet is placed between adherends and subjected to dielectric heating bonding with application of pressure, a resin in the melted single-layer sheet is likely to protrude from between stuck portions of the adherends. The protruding resin is likely to adhere to a surface other than bonded surfaces of the adherends and/or adhere to a dielectric heating device (for instance, an electrode or the like).

An object of the invention is to provide a high-frequency dielectric heating adhesive sheet unlikely to let, even during application of pressure for dielectric heating bonding of adherends, a resin protrude from between stuck portions of the adherends.

Means for Solving the Problem(s)

According to an aspect of the invention, a high-frequency dielectric heating adhesive sheet is provided, the high-frequency dielectric heating adhesive sheet including: a first adhesive layer; a second adhesive layer; and an intermediate layer located between the first adhesive layer and the second adhesive layer, the first adhesive layer containing a first thermoplastic resin, the second adhesive layer containing a second thermoplastic resin, a ratio DPM/DP1 of dielectric property DPM of the intermediate layer to dielectric property DP1 of the first adhesive layer and a ratio DPM/DP2 of the dielectric property DPM of the intermediate layer to dielectric property DP2 of the second adhesive layer each being less than one, the dielectric property DP1, the dielectric property DP2, and the dielectric property DPM being values of dielectric property (tan$\delta$/$\epsilon$'r) of the first adhesive layer, the second adhesive layer, and the intermediate layer, respectively. tan$\delta$ denotes a dielectric dissipation factor at 23 degrees C. and a frequency of 40.68 MHz and $\epsilon$'r denotes a relative permittivity at 23 degrees C. and the frequency of 40.68 MHz.

In the high-frequency dielectric heating adhesive sheet according to the aspect of the invention, it is preferable that at least one of the dielectric property DP1 of the first adhesive layer or the dielectric property DP2 of the second adhesive layer be 0.005 or more.

In the high-frequency dielectric heating adhesive sheet according to the aspect of the invention, it is preferable that the dielectric property DPM of the intermediate layer be less than 0.005.

In the high-frequency dielectric heating adhesive sheet according to the aspect of the invention, it is preferable that a thickness decrease rate between before and after application of a high-frequency wave to the high-frequency dielectric heating adhesive sheet be 50% or less.

In the high-frequency dielectric heating adhesive sheet according to the aspect of the invention, it is preferable that a sheet-thickness ratio Trx represented by an expression below (Expression 1) be in a range from 5 to 80, $$Trx=\{(Tx1+Tx2)/(Tx1+Tx2+Ty)\}\times100 \qquad \text{(Expression1)},$$

where

Tx1 denotes a thickness of the first adhesive layer,

Tx2 denotes a thickness of the second adhesive layer, and

Ty denotes a thickness of the intermediate layer.

In the high-frequency dielectric heating adhesive sheet according to the aspect of the invention, it is preferable that at least one of an MVR ratio MVRr1 represented by an expression below (Expression 2) or an MVR ratio MVRr2 represented by an expression below (Expression 3) be 0.01 or more, $$MVRr1=MVRx1/MVRy \qquad \text{(Expression2)}$$

$$MVRr2=MVRx2/MVRy \qquad \text{(Expression 3)},$$

where

MVRx1 denotes an MVR of the first adhesive layer at 230 degrees C.,

MVRx2 denotes an MVR of the second adhesive layer at 230 degrees C., and

MVRy denotes an MVR of the intermediate layer at 230 degrees C.

In the high-frequency dielectric heating adhesive sheet according to the aspect of the invention, it is preferable that MVRy denoting an MVR of the intermediate layer at 230 degrees C. be 60 cm$^3$/10 min or less.

In the high-frequency dielectric heating adhesive sheet according to the aspect of the invention, it is preferable that at least one of MVRx1 denoting an MVR of the first adhesive layer at 230 degrees C. or MVRx2 denoting an MVR of the second adhesive layer at 230 degrees C. be 0.5 cm$^3$/10 min or more.

In the high-frequency dielectric heating adhesive sheet according to the aspect of the invention, it is preferable that at least one of the first adhesive layer or the second adhesive layer further contain a dielectric filler that generates heat in response to a high-frequency wave.

In the high-frequency dielectric heating adhesive sheet according to the aspect of the invention, it is preferable that a volume content ratio of the dielectric filler in the at least one of the first adhesive layer or the second adhesive layer be in a range from 3 vol % to 60 vol %.

In the high-frequency dielectric heating adhesive sheet according to the aspect of the invention, it is preferable that the dielectric filler in the at least one of the first adhesive layer or the second adhesive layer contain at least one selected from the group consisting of zinc oxide, silicon carbide, barium titanate, and titanium oxide.

In the high-frequency dielectric heating adhesive sheet according to the aspect of the invention, it is preferable that at least one of the first thermoplastic resin or the second thermoplastic resin include a polyolefin resin.

In the high-frequency dielectric heating adhesive sheet according to the aspect of the invention, it is preferable that at least one of the first adhesive layer or the second adhesive layer be in direct contact with the intermediate layer.

In the high-frequency dielectric heating adhesive sheet according to the aspect of the invention, it is preferable that in each of the layers of the high-frequency dielectric heating adhesive sheet, a percentage of the number of lattices adhering without separation to one of the layers being in contact with the layer after a cross-cut test according to JIS K5600-5-6: 1999 be 50% or more.

According to the above aspect of the invention, it is possible to provide a high-frequency dielectric heating adhesive sheet unlikely to let, even during application of pressure for dielectric heating bonding of adherends, a resin protrude from between stuck portions of the adherends.

BRIEF DESCRIPTION OF DRAWING(S)

DESCRIPTION OF EMBODIMENT(S)

First Exemplary Embodiment

Figure 1:
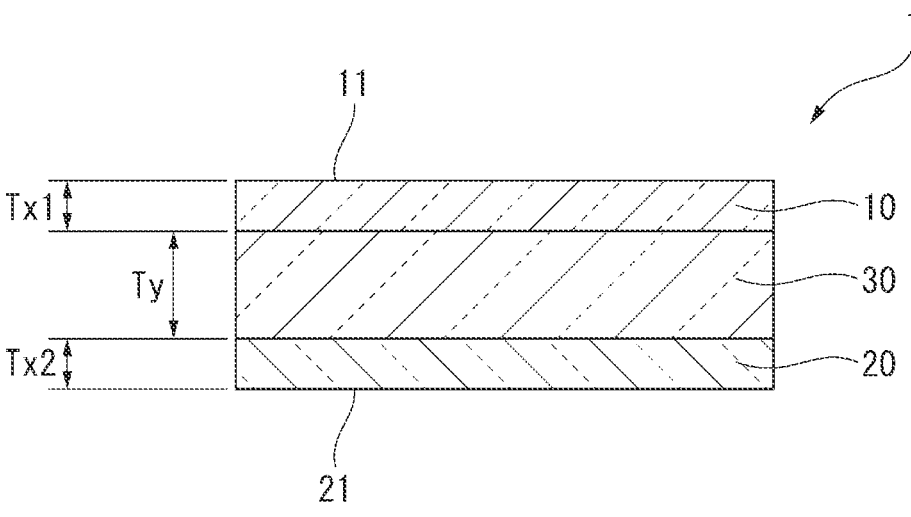
FIG. 1 is a schematic diagram of a high-frequency dielectric heating adhesive sheet according to an exemplary embodiment.

High-Frequency Dielectric Heating Adhesive Sheet A high-frequency dielectric heating adhesive sheet according to a first exemplary embodiment includes a first adhesive layer, a second adhesive layer, and an intermediate layer located between the first adhesive layer and the second adhesive layer. The first adhesive layer contains a first thermoplastic resin. The second adhesive layer contains a second thermoplastic resin. A ratio DPM/DP1 of dielectric property DPM of the intermediate layer to dielectric property DP1 of the first adhesive layer and a ratio DPM/DP2 of the dielectric property DPM of the intermediate layer to dielectric property DP2 of the second adhesive layer are each less than one. The dielectric property DP1, the dielectric property DP2, and the dielectric property DPM are values of dielectric property (tanδ/ε'r) of the first adhesive layer, the second adhesive layer, and the intermediate layer, respectively. tanδ denotes a dielectric dissipation factor at 23 degrees C. and a frequency of 40.68 MHz and ε'r denotes a relative permittivity at 23 degrees C. and a frequency of 40.68 MHz.

With the dielectric property ratios DPM/DP1 and DPM/DP2 each being less than one, the intermediate layer located on an internal side of the sheet is more unlikely to melt during application of a high-frequency wave than the first adhesive layer and the second adhesive layer located as outermost layers of the high-frequency dielectric heating adhesive sheet. The intermediate layer unlikely to melt is located on the internal side of the sheet, which makes it possible to thin layers likely to melt (the first adhesive layer and the second adhesive layer) within the whole of the sheet to reduce the amount of a resin melting during application of a high-frequency wave. As a result, application of a pressure to the high-frequency dielectric heating adhesive sheet between adherends during dielectric heating bonding is unlikely to cause the thermoplastic resin to protrude from between stuck portions of the adherends.

At least one of the dielectric property ratio DPM/DP1 or DPM/DP2 is preferably 0.8 or less, more preferably 0.6 or less, further preferably 0.4 or less, much further preferably 0.2 or less.

The dielectric property ratios DPM/DP1 and DPM/DP2 are usually zero or more.

Dielectric Property (tanδ/ε'r)

The dielectric properties of the adhesive layer, the intermediate layer, and the high-frequency dielectric heating adhesive sheet, or dielectric dissipation factors (tanδ) and relative permittivities (ε'r), can be easily and accurately measured using an impedance material analyzer.

Herein, the dielectric property (tanδ/ε'r) is a value determined by dividing a dielectric dissipation factor (tanδ) measured using an impedance material device or the like by a relative permittivity (ε'r) measured using the impedance material device or the like.

Details of a method of measuring the dielectric properties of the adhesive layer, the intermediate layer, and the high-frequency dielectric heating adhesive sheet are as follows. The adhesive layer, the intermediate layer, or the high-frequency dielectric heating adhesive sheet, which is cut into a predetermined size, is subjected to measurement of each of the relative permittivity (ε'r) and the dielectric dissipation factor (tanδ) under conditions of 23 degrees C. and a frequency of 40.68 MHz using an RF impedance material analyzer E4991A (manufactured by Agilent Technologies, Inc.) and a value of dielectric property (tanδ/ε'r) is calculated.

The dielectric property DPM of the intermediate layer is preferably less than 0.005, more preferably 0.004 or less, further preferably 0.003 or less, preferably 0.002 or less, preferably 0.001 or less.

With the dielectric property DPM of the intermediate layer being 0.03 or less, the intermediate layer is unlikely to generate heat, enabling further reducing protrusion of a resin from between the stuck portions of the adherends. In addition, with the dielectric property DPM of the intermediate layer being less than 0.005, the intermediate layer is likewise unlikely to generate heat, enabling further reducing protrusion of a resin from between the stuck portions of the adherends.

The dielectric property DPM of the intermediate layer is usually zero or more.

At least one of the dielectric property DP1 of the first adhesive layer or the dielectric property DP2 of the second adhesive layer is preferably 0.005 or more, more preferably 0.008 or more, further preferably 0.01 or more.

At least one of the dielectric property DP1 of the first adhesive layer or the dielectric property DP2 of the second adhesive layer is preferably 0.08 or less, more preferably 0.05 or less.

With the dielectric property DP1 of the first adhesive layer being 0.005 or more, it is possible to prevent a problem that a dielectric heating treatment fails to cause the first adhesive layer to perform a predetermined heat generation, making it difficult to firmly bond the first adhesive layer and an adherend to each other.

With the dielectric property DP2 of the second adhesive layer being 0.005 or more, it is possible to prevent a problem that the dielectric heating treatment fails to cause the second adhesive layer to perform a predetermined heat generation, making it difficult to firmly bond the second adhesive layer and an adherend to each other.

With the dielectric property DP1 of the first adhesive layer being 0.08 or less, an adherend in contact with the first adhesive layer is unlikely to be damaged.

With the dielectric property DP2 of the second adhesive layer being 0.08 or less, an adherend in contact with the second adhesive layer is unlikely to be damaged.

With the dielectric property DP1 of the first adhesive layer and the dielectric property DP2 of the second adhesive layer both being 0,005 or more, it is possible to prevent a problem that the dielectric heating treatment fails to cause a predetermined heat generation to be performed, making it difficult to firmly bond adherends to each other.

With the dielectric property DP1 of the first adhesive layer and the dielectric property DP2 of the second adhesive layer both being 0.08 or less, adherends bonded to opposite surfaces of the high-frequency dielectric heating adhesive sheet are unlikely to be damaged.

The dielectric property DP1 of the first adhesive layer and the dielectric property DP2 of the second adhesive layer are the same as or different from each other.

The dielectric property $(\tan\delta/\varepsilon'r)$ of the high-frequency dielectric heating adhesive sheet is preferably 0.005 or more, more preferably 0.008 or more, further preferably 0.01 or more. In addition, the dielectric property $(\tan\delta/\varepsilon'r)$ of the high-frequency dielectric heating adhesive sheet is preferably 0.08 or less, more preferably 0.05 or less.

With the dielectric property of the high-frequency dielectric heating adhesive sheet being 0.005 or more, it is possible to prevent a problem that the dielectric heating treatment fails to cause a predetermined heat generation to be performed, making it difficult to firmly bond adherends to each other.

With the dielectric property of the high-frequency dielectric heating adhesive sheet being 0.08 or less, an adherend is unlikely to be damaged.

In the high-frequency dielectric heating adhesive sheet according to the exemplary embodiment, it is preferable that at least one of the first adhesive layer or the second adhesive layer be in direct contact with the intermediate layer. In addition, it is also preferable that both the first adhesive layer and the second adhesive layer be in direct contact with the intermediate layer.

In the high-frequency dielectric heating adhesive sheet according to the exemplary embodiment, it is preferable that the intermediate layer contain one or a plurality of thermoplastic resins. It is more preferable that the intermediate layer contain at least one of the first thermoplastic resin or the second thermoplastic resin in terms of adhesiveness. It is also preferable that a main composition of the thermoplastic resin contained in the intermediate layer be the same as at least one of a main composition of the first thermoplastic resin or a main composition of the second thermoplastic resin. In addition, it is also preferable that the main composition of the thermoplastic resin contained in the intermediate layer be the same as the main composition of the first thermoplastic resin and the main composition of the second thermoplastic resin.

The wording "a main composition of a thermoplastic resin" refers to, for instance, in a case where the thermoplastic resin is a polymer, the most contained repeating unit in the polymer among repeating units contained in the polymer. In a case where the thermoplastic resin is a polymer derived from a single monomer, "a main composition of a thermoplastic resin" refers to the monomer unit (repeating unit). In a case where the thermoplastic resin is a copolymer, "a main composition of a thermoplastic resin" refers to the most contained repeating unit in the polymer. In a case where the thermoplastic resin is a copolymer, "a main composition of a thermoplastic resin" in the copolymer refers to a repeating unit (monomer unit) contained at a content of 30 mass % or more, a repeating unit contained at a content of more than 30 mass % in an implementation, a repeating unit contained at a content of 40 mass % or more in another implementation, or a repeating unit contained at a content of 50 mass % or more in still another implementation. In addition, in a case where the thermoplastic resin is a copolymer, two or more repeating units may be the most contained repeating units.

FIG. 1 illustrates a schematic cross sectional view of an example of the high-frequency dielectric heating adhesive sheet according to the exemplary embodiment. A high-frequency dielectric heating adhesive sheet 1 includes, as outermost layers, a first adhesive layer 10 and a second adhesive layer 20 located on a surface side opposite the first adhesive layer 10 and an intermediate layer 30 located between the first adhesive layer 10 and the second adhesive layer 20. In the high-frequency dielectric heating adhesive sheet 1 illustrated in FIG. 1, the first adhesive layer 10 and the intermediate layer 30 are in direct contact with each other and the second adhesive layer 20 and the intermediate layer 30 are in direct contact with each other. The high-frequency dielectric heating adhesive sheet 1 has a first surface 11 and a second surface 21 opposite the first surface 11.

Thermoplastic Resin

In the high-frequency dielectric heating adhesive sheet according to the exemplary embodiment, the first thermoplastic resin and the second thermoplastic resin may be the same as or different from each other. In the high-frequency dielectric heating adhesive sheet according to the exemplary embodiment, it is preferable that a thermoplastic resin contained in the intermediate layer be also selected and used from resins similar to those mentioned in the descriptions on the later-described first thermoplastic resin and second thermoplastic resin as appropriate.

In a case where the first thermoplastic resin and the second thermoplastic resin are the same, costs of manufacturing the high-frequency dielectric heating adhesive sheet are likely to be reduced and the manufactured high-frequency dielectric heating adhesive sheet is unlikely to delaminate.

In a case where the first thermoplastic resin and the second thermoplastic resin are different resins, the high-frequency dielectric heating adhesive sheet according to the exemplary embodiment allows for easily bonding adherends including different materials from each other. For instance, in a case where a first adherend, which is to be brought into contact with the first adhesive layer, and a second adherend, which is to be brought into contact with the second adhesive layer, include different materials from each other, a resin likely to stick to the first adherend can be used as the first thermoplastic resin, while a resin likely to stick to the second adherend can be used as the second thermoplastic resin.

The types of the first thermoplastic resin and the second thermoplastic resin are not limited.

In terms of, for instance, meltability, possession of a predetermined heat resistance, and the like, the first thermoplastic resin and the second thermoplastic resin may each be at least one selected from the group consisting of a polyolefin resin, a styrene resin, a polyacetal resin, a polycarbonate resin, a polyacrylic resin, a polyamide resin, a polyimide resin, a polyvinyl acetate resin, a phenoxy resin, and a polyester resin.

In the high-frequency dielectric heating adhesive sheet 1 according to the exemplary embodiment, it is preferable that at least one of the first thermoplastic resin or the second thermoplastic resin be a polyolefin resin.

Herein, the polyolefin resin, which includes a polyolefin resin having a polar part and a polyolefin resin having no polar part, is described as a polyolefin resin having a polar part or a polyolefin resin having no polar part in a case where the presence/absence of a polar part is specified.

It is also preferable that at least one of the first thermoplastic resin or the second thermoplastic resin be a polyolefin resin having a polar part. At least one of the first thermoplastic resin or the second thermoplastic resin may be a polyolefin resin having no polar part.

Polyolefin Resin

Examples of the polyolefin resin as the thermoplastic resin include a resin including a homopolymer such as polyethylene, polypropylene, polybutene, or polymethylpentene and an α-olefin resin including a copolymer of a monomer selected from the group consisting of ethylene, propylene, butene, hexene, octene, and 4-methylpentene. The polyolefin resin as the thermoplastic resin may be merely a single resin or a combination of two or more resins.

Polyolefin Resin Having Polar Part

Regarding the polyolefin resin having a polar part, the polar part is not limited as long as the part can polarize the polyolefin resin. The polyolefin resin having a polar part is preferable as exhibiting a high bonding force with respect to an adherend.

The thermoplastic resin may be a copolymer of an olefin monomer and a monomer having a polar part. In addition, the thermoplastic resin may be a resin provided by introducing a polar part into an olefin polymer by modification such as an addition reaction, the olefin polymer being obtained by polymerization of an olefin monomer.

The type of the olefin monomer constituting the polyolefin resin having a polar part as the thermoplastic resin is not limited. Examples of the olefin monomer include ethylene, propylene, butene, hexene, octene, and 4-methyl-1-pentene. One of the above examples may be used alone or a combination of two or more thereof may be used as the olefin monomer.

Ethylene and propylene are preferable as the olefin monomer in terms of achieving an excellent mechanical strength and stable bonding characteristics.

A constituent unit derived from an olefin in the polyolefin resin having a polar part is preferably a constituent unit derived from ethylene or propylene.

Examples of the polar part include a hydroxyl group, a carboxy group, a vinyl acetate structure, an acid anhydride structure, and an acid-modified structure that is introduced into a polyolefin resin by acid modification.

The acid-modified structure as the polar part is a part that is introduced by acid-modifying a thermoplastic resin (for instance, a polyolefin resin). Examples of a compound used to a graft-modify a thermoplastic resin (for instance, a polyolefin resin) include an unsaturated carboxylic acid derivative component derived from any one of an unsaturated carboxylic acid, an acid anhydride of an unsaturated carboxylic acid, and an ester of an unsaturated carboxylic acid.

Examples of the unsaturated carboxylic acid include an acrylic acid, a methacrylic acid, a maleic acid, a fumaric acid, an itaconic acid, and a citraconic acid.

Examples of the acid anhydride of an unsaturated carboxylic acid include acid anhydrides of unsaturated carboxylic acids such as a maleic anhydride, an itaconic anhydride, and a citraconic anhydride.

Examples of the ester of an unsaturated carboxylic acid include esters of unsaturated carboxylic acids such as methyl acrylate, ethyl acrylate, methyl methacrylate, ethyl methacrylate, butyl methacrylate, dimethyl maleate, monomethyl maleate, dimethyl fumarate, diethyl fumarate, dimethyl itaconate, diethyl itaconate, dimethyl citraconate, diethyl citraconate, and tetrahydro dimethyl phthalic anhydride.

In a case where the thermoplastic resin is a copolymer of an olefin monomer and a monomer having a polar part, the copolymer preferably contains a constituent unit derived from the monomer having a polar part at a content of 2 mass % or more, more preferably 4 mass % or more, further preferably 5 mass % or more, much further preferably 6 mass % or more. In addition, the copolymer preferably contains the constituent unit derived from the monomer having a polar part at a content of 30 mass % or less, more preferably 25 mass % or less, further preferably 20 mass % or less, particularly preferably 15 mass % or less.

By virtue of the copolymer containing a constituent unit derived from a monomer having a polar part at a content of 2 mass % or more, the bonding strength of the high-frequency dielectric heating adhesive sheet is improved. In addition, by virtue of the copolymer containing a constituent unit derived from a monomer having a polar part at a content of 30 mass % or less, a tackiness of the thermoplastic resin can be kept from extremely increasing. As a result, it is likely to prevent a forming process of the high-frequency dielectric heating adhesive sheet from becoming difficult.

In a case where the polyolefin resin as the thermoplastic resin has an acid-modified structure, a rate of acid modification is preferably 0.01 mass % or more, more preferably 0.1 mass % or more, further preferably 0.2 mass % or more.

In a case where the polyolefin resin as the thermoplastic resin has the acid-modified structure, the rate of acid modification is preferably 30 mass % or less, more preferably 20 mass % or less, further preferably 10 mass % or less.

In a case where the thermoplastic resin has the acid-modified structure, the bonding strength of the high-frequency dielectric heating adhesive sheet is improved at a rate of acid modification of 0.01 mass % or more. In addition, the tackiness of the thermoplastic resin can be kept from extremely increasing at a rate of acid modification of 30 mass % or less. As a result, it is likely to prevent a forming process of the high-frequency dielectric heating adhesive sheet from becoming difficult.

Herein, the rate of modification refers to a percentage of a mass of a part derived from an acid relative to the total mass of the acid-modified polyolefin.

Maleic-Anhydride-Modified Polyolefin

It is more preferable that the polyolefin resin as the thermoplastic resin have an acid anhydride structure as an acid-modified structure. It is preferable that the acid anhydride structure be a structure that is introduced in response to modifying a polyolefin resin with a maleic anhydride.

Regarding the maleic-anhydride-modified polyolefin, a rate of maleic anhydride modification is preferably in a range similar to that of the rate of modification in a case where the polyolefin resin as the thermoplastic resin has an acid-modified structure and an effect achievable by virtue of the rate being in the range is similar to that achievable in a case where the polyolefin resin as the thermoplastic resin has an acid-modified structure.

It is preferable that a constituent unit derived from olefin in the maleic-anhydride-modified polyolefin be a constituent unit derived from ethylene or propylene. In other words, it is preferable that the maleic-anhydride-modified polyolefin be a maleic-anhydride-modified polyethylene resin or a maleic-anhydride-modified polypropylene resin.

Olefin-Vinyl-Acetate Copolymer Resin

It is also preferable that the thermoplastic resin according to the exemplary embodiment be a copolymer (an olefin-vinyl-acetate copolymer resin) containing a constituent unit derived from olefin and a constituent unit derived from vinyl acetate.

It is preferable that the olefin-vinyl-acetate copolymer resin as the thermoplastic resin contain a constituent unit derived from vinyl acetate in a range similar to that of the constituent unit derived from the monomer having a polar part in a case where the thermoplastic resin is the copolymer of the olefin monomer and the monomer having a polar part and an effect achievable by virtue of that range is also similar to that in a case where the thermoplastic resin is the copolymer of the olefin monomer and the monomer having a polar part.

In terms of achieving an excellent mechanical strength and a stable bonding performance, it is preferable that the constituent unit derived from olefin in the olefin-vinyl-acetate copolymer resin be a constituent unit derived from ethylene or propylene.

Accordingly, the thermoplastic resin is preferably at least one of an ethylene-vinyl-acetate copolymer resin or a propylene-vinyl-acetate copolymer resin, more preferably an ethylene-vinyl-acetate copolymer resin. It is preferable that a constituent unit derived from vinyl acetate in the ethylene-vinyl-acetate copolymer resin and the propylene-vinyl-acetate copolymer resin be also in a range similar to the percentage (mass %) in the description on the olefin-vinyl-acetate copolymer resin.

It is also preferable that at least one of the first thermoplastic resin or the second thermoplastic resin be a thermoplastic resin that generates heat in response to a high-frequency wave.

The thermoplastic resin that generates heat in response to a high-frequency wave is preferably a thermoplastic resin that generates heat in response to application of a high-frequency voltage with a frequency range of 3 MHz to 300 MHz. The thermoplastic resin that generates heat in response to a high-frequency wave is more preferably a thermoplastic resin that generates heat in response to application of a high-frequency voltage with, within the frequency range of 3 MHz to 300 MHz, for instance, a frequency of 27.12 MHz or 40.68 MHz.

Dielectric Filler

In the high-frequency dielectric heating adhesive sheet according to the exemplary embodiment, it is preferable that at least one of the first adhesive layer or the second adhesive layer further contain a dielectric filler that generates heat in response to a high-frequency wave. The dielectric filler contained in the first adhesive layer is sometimes referred to as a first dielectric filler. The dielectric filler contained in the second adhesive layer is sometimes referred to as a second dielectric filler.

It is preferable that the first dielectric filler and the second dielectric filler be fillers that generate heat in response to application of a high-frequency voltage having a frequency range of 3 MHz to 300 MHz. It is preferable that the first dielectric filler and the second dielectric filler be fillers that generate heat in response to application of a high-frequency voltage having, within the frequency range of 3 MHz to 300 MHz, for instance, a frequency of 13.56 MHz, 27.12 MHz, or 40.68 MHz.

Type

The first dielectric filler and the second dielectric filler are each independently favorably one or a combination of two or more of zinc oxide, silicon carbide (SiC), titanium oxide, barium titanate, barium zirconate titanate, lead titanate, potassium niobate, hydrated aluminum silicate, an inorganic material having crystal water such as a hydrated aluminosilicate of an alkali metal or an inorganic material having crystal water such as a hydrated aluminosilicate of an alkali earth metal, and the like. The types of the first dielectric filler and the second dielectric filler are the same as or different from each other.

It is preferable that at least one of the dielectric filler in the first adhesive layer or the dielectric filler in the second adhesive layer contain at least one selected from the group consisting of zinc oxide, silicon carbide, barium titanate, and titanium oxide.

It is preferable that the first dielectric filler and the second dielectric filler be each independently at least one selected from the group consisting of zinc oxide, silicon carbide, barium titanate, and titanium oxide.

It is further preferable that at least one of the first dielectric filler or the second dielectric filler be zinc oxide among the dielectric fillers listed by way of example, since zinc oxide has a lot of types and various shapes and sizes thereof are selectable, which allows for improving the bonding characteristics and mechanical characteristics of the high-frequency dielectric heating adhesive sheet in accordance with the purpose of use. Using zinc oxide as the dielectric filler makes it possible to obtain a colorless high-frequency dielectric heating adhesive sheet. Zinc oxide is small in density among dielectric fillers. Thus, in a case where adherends are bonded using a high-frequency dielectric heating adhesive sheet containing zinc oxide as a dielectric filler, a total weight of a joined body is unlikely to increase as compared with in a case where a sheet containing another dielectric filler is used. Zinc oxide is not extremely high in hardness among ceramics and thus is unlikely to damage a manufacturing device for a high-frequency dielectric heating adhesive sheet. Zinc oxide is an inactive oxide and can thus be blended with a thermoplastic resin with a small damage to the thermoplastic resin.

In addition, titanium oxide as a dielectric filler is preferably at least one of anatase titanium oxide or rutile titanium oxide, more preferably anatase titanium oxide in terms of excellent dielectric property.

Volume Content Ratio

At least one of a volume content ratio of the dielectric filler in the first adhesive layer or a volume content ratio of the dielectric filler in the second adhesive layer is preferably 3 vol % or more, more preferably 5 vol % or more, further preferably 8 vol % or more.

At least one of the volume content ratio of the dielectric filler in the first adhesive layer or the volume content ratio of the dielectric filler in the second adhesive layer is preferably 60 vol % or less, more preferably 50 vol % or less, further preferably 40 vol % or less, much further preferably 35 vol % or less.

With the volume content ratio of the first dielectric filler in the first adhesive layer being 3 vol % or more, the first adhesive layer and the first adherend are likely to be firmly bonded to each other.

With the volume content ratio of the second dielectric filler in the second adhesive layer being 3 vol % or more, the second adhesive layer and the second adherend are likely to be firmly bonded to each other.

With the volume content ratio of the first dielectric filler in the first adhesive layer being 60 vol % or less, the first adhesive layer is easily machinable.

With the volume content ratio of the second dielectric filler in the second adhesive layer being 60 vol % or less, the second adhesive layer is easily machinable.

With the volume content ratios of the first dielectric filler and the second dielectric filler both being 3 vol % or more, the first adherend and the second adherend are likely to be firmly bonded to each other using the high-frequency dielectric heating adhesive sheet according to the exemplary embodiment.

With the volume content ratios of the first dielectric filler and the second dielectric filler both being 60 vol % or less, the first adhesive layer and the second adhesive layer are likely to be flexible and, additionally, a decrease in toughness thereof is likely to be prevented. Thus, even the high-frequency dielectric heating adhesive sheet is likely to be flexible as a whole and, additionally, a decrease in toughness thereof is likely to be prevented, which facilitates machining of the high-frequency dielectric heating adhesive sheet into a desired form in a subsequent process.

The volume content ratios of the first dielectric filler in the first adhesive layer and the second dielectric filler in the second adhesive layer are the same as or different from each other.

Although the intermediate layer may also contain a dielectric filler, it is preferable that the dielectric filler (sometimes referred to as a third dielectric filler) in the intermediate layer have a volume content ratio smaller than the volume content ratio of the dielectric filler in the first adhesive layer and the volume content ratio of the dielectric filler in the second adhesive layer.

The volume content ratio of the third dielectric filler in the intermediate layer is preferably 3 vol % or less, more preferably 1 vol % or less, further preferably 0.1 vol % or less. The intermediate layer much further preferably contains no dielectric filler. With the volume content ratio of the third dielectric filler being 3 vol % or less, protrusion of a resin from between the stuck portions of adherends is likely to be reduced.

The volume content ratio of the third dielectric filler in the intermediate layer is usually 0 vol % or more.

Volume Average Particle Diameter

At least one of a volume average particle diameter of the first dielectric filler or a volume average particle diameter of the second dielectric filler is preferably 1 μm or more, more preferably 2 μm or more, further preferably 3 μm or more.

At least one of the volume average particle diameter of the first dielectric filler or the volume average particle diameter of the second dielectric filler is preferably 30 μm or less, more preferably 25 μm or less, further preferably 20 μm or less.

With the volume average particle diameter of the first dielectric filler in the first adhesive layer being 1 μm or more, the first adhesive layer can exhibit a high heat generation performance in response to application of a high-frequency wave.

With the volume average particle diameter of the first dielectric filler in the first adhesive layer being 30 μm or less, a decrease in strength of the first adhesive layer can be prevented and a high heat generation performance can be exhibited in response to application of a high-frequency wave.

With the volume average particle diameter of the second dielectric filler in the second adhesive layer being 1 μm or more, the second adhesive layer can exhibit a high heat generation performance in response to application of a high-frequency wave.

With the volume average particle diameter of the second dielectric filler in the second adhesive layer being 30 μm or less, a decrease in strength of the second adhesive layer can be prevented and a high heat generation performance can be exhibited in response to application of a high-frequency wave.

With the volume average particle diameter of the first dielectric filler and the volume average particle diameter of the second dielectric filler both being 1 μm or more, the high-frequency dielectric heating adhesive sheet according to the exemplary embodiment exhibits a high heat generation performance as the entirety of the sheet in response to application of a high-frequency wave, allowing for firmly bonding the first adherend and the second adherend to each other in a shorter time.

With the volume average particle diameter of the first dielectric filler and the volume average particle diameter of the second dielectric filler both being 30 μm or less, a decrease in strength of the high-frequency dielectric heating adhesive sheet can be prevented and a high heat generation performance can be exhibited as the entirety of the sheet in response to application of a high-frequency wave.

The volume average particle diameter of the first dielectric filler and the volume average particle diameter of the second dielectric filler are the same as or different from each other.

In a case where the intermediate layer contains the third dielectric filler, a volume average particle diameter of the third dielectric filler is preferably 1 μm or more, more preferably 2 μm or more, further preferably 3 μm or more. In addition, the volume average particle diameter of the third dielectric filler is preferably 30 μm or less, more preferably 25 μm or less, further preferably 20 μm or less.

The volume average particle diameter of the dielectric filler is measured by a method as follows. A particle size distribution of the dielectric filler is measured by laser diffraction/scattering and the volume average particle diameter is calculated from a result of the particle size distribution measurement in accordance with JIS Z 8819-2: 2001.

Additives

The high-frequency dielectric heating adhesive sheet according to the exemplary embodiment may contain an additive or may contain no additive. In a case where the high-frequency dielectric heating adhesive sheet according to the exemplary embodiment contains an additive, it is preferable that at least one of the first adhesive layer, the second adhesive layer, or the intermediate layer contain the additive.

In a case where the high-frequency dielectric heating adhesive sheet according to the exemplary embodiment contains an additive, examples of the additive include a tackifier, a plasticizer, a wax, a colorant, an antioxidant, an ultraviolet absorber, an antimicrobial agent, a coupling agent, a viscosity modifier, an organic filler, and an inorganic filler. The organic filler and the inorganic filler as the additives are different from the dielectric fillers.

The tackifier and the plasticizer allow for improving the melting characteristics and bonding characteristics of the high-frequency dielectric heating adhesive sheet.

Examples of the tackifier include a rosin derivative, a polyterpene resin, an aromatic modified terpene resin, a hydride of an aromatic modified terpene resin, a terpene phenol resin, a coumarone-indene resin, an aliphatic petroleum resin, an aromatic petroleum resin, and a hydride of an aromatic petroleum resin.

Examples of the plasticizer include petroleum process oil, natural oil, dialkyl diacid, and low-molecular-weight liquid polymer. Examples of the petroleum process oil include a paraffin process oil, a naphthene process oil, and an aromatic process oil. Examples of the natural oil include a castor oil and a tall oil. Examples of dialkyl diacid include dibutyl phthalate, dioctyl phthalate, and dibutyl adipate. Examples of the low-molecular-weight liquid polymer include liquid polybutene and liquid polyisoprene.

In a case where the high-frequency dielectric heating adhesive sheet according to the exemplary embodiment includes an additive, a content ratio of the additive in the high-frequency dielectric heating adhesive sheet is usually, with reference to an entire quantity of the high-frequency dielectric heating adhesive sheet, preferably 0.01 mass % or more, more preferably 0.05 mass % or more, further preferably 0.1 mass % or more. In addition, the content ratio of the additive in the high-frequency dielectric heating adhesive sheet is preferably 20 mass % or less, more preferably 15 mass % or less, further preferably 10 mass % or less.

It is preferable that the high-frequency dielectric heating adhesive sheet according to the exemplary embodiment contain none of electrically conductive substances such as carbon or a carbon compound containing carbon as a main component (for instance, carbon black or the like) and a metal. Content ratios of the electrically conductive substances are each independently, with reference to the entire quantity of the high-frequency dielectric heating adhesive sheet, preferably 5 mass % or less, more preferably 1 mass % or less, further preferably 0.1 mass % or less, much further preferably 0 mass %.

With the content ratio of the electrically conductive substance in the high-frequency dielectric heating adhesive sheet being 5 mass % or less, a problem of carbonization of a bonded portion and an adherend caused by electrical breakdown during a dielectric heating treatment is likely to be prevented.

In the high-frequency dielectric heating adhesive sheet according to the exemplary embodiment, at least one of a total mass of the thermoplastic resin and the dielectric filler relative to an entire mass of the first adhesive layer or a total mass of the thermoplastic resin and the dielectric filler relative to an entire mass of the second adhesive layer is preferably 80 mass % or more, more preferably 90 mass % or more, further preferably 99 mass % or more.

The total mass of the thermoplastic resin and the dielectric filler relative to an entire mass of the high-frequency dielectric heating adhesive sheet according to the exemplary embodiment is preferably 80 mass % or more, more preferably 90 mass % or more, further preferably 99 mass % or more.

In the high-frequency dielectric heating adhesive sheet according to the exemplary embodiment, a volume content ratio of the first thermoplastic resin relative to all the thermoplastic resins in the first adhesive layer is preferably 50 vol % or more, more preferably 60 vol % or more, further preferably 70 vol % or more, much further preferably 80 vol %, particularly further preferably 90 vol % or more.

In the high-frequency dielectric heating adhesive sheet according to the exemplary embodiment, a volume content ratio of the second thermoplastic resin relative to all the thermoplastic resins in the second adhesive layer is preferably 50 vol % or more, more preferably 60 vol % or more, further preferably 70 vol % or more, much further preferably 80 vol % or more, particularly further preferably 90 vol % or more.

Form and Characteristics of High-Frequency Dielectric Heating Adhesive Sheet

Thickness of High-Frequency Dielectric Heating Adhesive Sheet

The thickness of the high-frequency dielectric heating adhesive sheet is preferably 10 μm or more, more preferably 30 μm or more, further preferably 50 μm or more.

With the thickness of the high-frequency dielectric heating adhesive sheet being 10 μm or more, an absolute amount of a substance that generates heat in response to a high-frequency wave contained in the sheet is not reduced and thus the sheet is likely to generate heat.

An upper limit of the thickness of the high-frequency dielectric heating adhesive sheet is not limited. Since a weight of the entire joined body obtained by bonding the first adherend and the second adherend to each other increases with an increase in thickness of the high-frequency dielectric heating adhesive sheet, it is preferable that the high-frequency dielectric heating adhesive sheet have a thickness in a range sufficient for a practical use. In consideration of practicality and formability of the high-frequency dielectric heating adhesive sheet, the thickness of the high-frequency dielectric heating adhesive sheet is preferably 2000 μm or less, more preferably 1000 μm or less, further preferably 600 μm or less.

Sheet-Thickness Ratio

The high-frequency dielectric heating adhesive sheet has a sheet-thickness ratio Trx represented by the following expression (Expression 1), which is preferably 5 or more, more preferably 10 or more, further preferably 15 or more.

The sheet-thickness ratio Trx represented by the following expression (Expression 1) is preferably 80 or less, more preferably 70 or less, further preferably 60 or less.

$$Trx = \{(Tx1+Tx2)/(Tx1+Tx2+Ty)\} \times 100 \qquad \text{(Expression 1)}$$

Tx1 denotes a thickness of the first adhesive layer, Tx2 denotes a thickness of the second adhesive layer, and Ty denotes a thickness of the intermediate layer.

With the sheet-thickness ratio Trx being 5 or more, a ratio of the thicknesses of the adhesive layers to an entire thickness of the high-frequency dielectric heating adhesive sheet is not extremely reduced, enabling reducing a decrease in bonding performance to an adherend.

With the sheet-thickness ratio Trx being 80 or less, the ratio of the thicknesses of the adhesive layers to the entire thickness of the high-frequency dielectric heating adhesive sheet is not extremely increased, enabling further reducing protrusion of a resin from between stuck portions of adherends.

At least one of the thickness of the first adhesive layer or the thickness of the second adhesive layer is preferably 5 μm or more, more preferably 10 μm or more, further preferably 20 μm or more.

At least one of the thickness of the first adhesive layer or the thickness of the second adhesive layer is preferably 800 μm or less, more preferably 600 μm or less, further preferably 400 μm or less.

With the first adhesive layer having a thickness of 5 μm or more, the first adhesive layer exhibits an excellent heat generation performance and thus the bonding strength is likely to be obtained.

With the second adhesive layer having a thickness of 5 μm or more, the second adhesive layer exhibits an excellent heat generation performance and thus the bonding strength is likely to be obtained.

With the first adhesive layer having a thickness of 800 μm or less, the amount of a resin protruding from the first adhesive layer at the time of bonding is likely to be reduced. In addition, the amount of heat generation is prevented from extremely increasing and thus melting of the intermediate layer is likely to be prevented.

With the second adhesive layer having a thickness of 800 μm or less, the amount of a resin protruding from the second adhesive layer at the time of bonding is likely to be reduced. In addition, the amount of heat generation is prevented from extremely increasing and thus melting of the intermediate layer is likely to be prevented.

With the first adhesive layer and the second adhesive layer both having a thickness of 5 μm or more, the high-frequency dielectric heating adhesive sheet exhibits an excellent heat generation performance and thus the bonding strength is likely to be obtained.

With the first adhesive layer and the second adhesive layer both having a thickness of 800 μm or less, the amount of a resin protruding from the high-frequency dielectric heating adhesive sheet at the time of bonding is likely to be reduced. In addition, the amount of heat generation is prevented from extremely increasing and thus melting of the intermediate layer is likely to be prevented.

The thickness of the intermediate layer is preferably 10 μm or more, more preferably 25 μm or more, further preferably 50 μm or more, much further preferably 75 μm or more, particularly further preferably 100 μm or more.

The thickness of the intermediate layer is preferably 1000 μm or less, more preferably 800 μm or less, further preferably 750 min or less.

With the intermediate layer having a thickness of 10 μm or more, an increase in the amount of protrusion from the high-frequency dielectric heating adhesive sheet is likely to be prevented.

With the intermediate layer having a thickness of 1000 μm or less, the high-frequency dielectric heating adhesive sheet is likely to have machining suitability.

In the high-frequency dielectric heating adhesive sheet according to the exemplary embodiment, at least one of a ratio $Tx1/D_{F1}$ between an average particle diameter $D_{F1}$ of the first dielectric filler and the thickness Tx1 of the first adhesive layer or a ratio $Tx2/D_{F2}$ between an average particle diameter $D_{F2}$ of the second dielectric filler and the thickness Tx2 of the second adhesive layer is preferably 0.8 or more, more preferably 1 or more, further preferably 2 or more, much further preferably 3 or more.

At least one of the ratio $Tx1/D_{F1}$ or the ratio $Tx2/D_{F2}$ is preferably 2500 or less, preferably 2000 or less, preferably 1750 or less, more preferably 1000 or less, further preferably 500 or less, much further preferably 100 or less, particularly further preferably 50 or less.

With the ratio $Tx1/DF_1$ being 0.8 or more, it is possible to prevent a decrease in bonding strength resulting from the first dielectric filler and an adherend being brought into contact with each other at the time of bonding.

With the ratio $Tx2/D_{F2}$ being 0.8 or more, it is possible to prevent a decrease in bonding strength resulting from the second dielectric filler and an adherend being brought into contact with each other at the time of bonding.

With the ratio $Tx1/D_{F1}$ being 2500 or less, it is possible to reduce a load on a sheet manufacturing device during production of the first adhesive layer.

With the ratio $Tx2/D_{F2}$ being 2500 or less, it is possible to reduce a load on the sheet manufacturing device during production of the second adhesive layer.

With the ratio $Tx1/D_{F1}$ and the ratio $Tx2/D_{F2}$ both being 0.8 or more (preferably 1 or more), it is possible to prevent a decrease in bonding strength resulting from the dielectric fillers and adherends being brought into contact with each other on the opposite surfaces of the high-frequency dielectric heating adhesive sheet at the time of bonding.

With the ratio $Tx1/D_{F1}$ and the ratio $Tx2/D_{F2}$ both being 2500 or less, it is possible to reduce a load on the sheet manufacturing device during production of the high-frequency dielectric heating adhesive sheet.

The ratio $Tx1/D_{F1}$ and the ratio $Tx2/D_{F2}$ are the same as or different from each other.

Sheet-Thickness Decrease Rate

In the high-frequency dielectric heating adhesive sheet according to the exemplary embodiment, a thickness decrease rate between before and after application of a high-frequency wave to the high-frequency dielectric heating adhesive sheet is preferably 50% or less, more preferably 40% or less, further preferably 30% or less, particularly further preferably 20% or less.

With the thickness decrease rate being 50% or less, a resin is unlikely to protrude and, consequently, a protruding resin is likely to be prevented from adhering to a portion other than the bonded portions of adherends and/or adhering to a dielectric heating device (for instance, an electrode or the like).

The thickness decrease rate is usually 0% or more.

The thickness decrease rate is a value measured by the following measurement method. A pair of adherends (size: 25 mm×12.5 mm, thickness: 1.5 mm) and a high-frequency dielectric heating adhesive sheet (size: 25 mm×12.5 mm, thickness: D1), which is interposed between the pair of adherends, are fixed between electrodes of a high-frequency dielectric heating device. Subsequently, a thickness D2 of the high-frequency dielectric heating adhesive sheet having been subjected to application of a high-frequency wave for 10 seconds under conditions including a frequency of 40.68 MHz, an output of 200 W, and a pressure of 0.5 MPa is measured. The thickness decrease rate is calculated by the following expression (Expression 4).

$$\{(D1-D2)/D1\}\times100 \hspace{2cm} (Expression 4)$$

In the above expression (Expression 4), a unit of D1 and D2 is μm.

In the high-frequency dielectric heating adhesive sheet 1 according to the exemplary embodiment, at least one of an MVR ratio MVRr1 represented by the following expression (Expression 2) or an MVR ratio MVRr2 represented by the following expression (Expression 3) is preferably 0.01 or more, more preferably 0.05 or more, further preferably 0.10 or more.

At least one of the ratio MVRr1 or the ratio MVRr2 is preferably 20 or less, more preferably 10 or less, further preferably 5 or less.

$$MVRr1 = MVRx1/MVRy \qquad \text{(Expression 2)}$$

$$MVRr2 = MVRx2/MVRy \qquad \text{(Expression 3)}$$

In the above expression (Expression 2) or expression (Expression 3), MVRx1 denotes an MVR of the first adhesive layer at 230 degrees C., MVRx2 denotes an MVR of the second adhesive layer at 230 degrees C., and MVRy denotes an MVR of the intermediate layer 30 at 230 degrees C. MVR is the abbreviation of melt volume-flow rate and a unit thereof is $cm^3/10$ min.

With the ratio MVRr1 being 0.01 or more, the first adhesive layer is likely to be melted during high-frequency dielectric heating with a bonding performance between the first adhesive layer and an adherend improved.

With the ratio MVRr2 being 0.01 or more, the second adhesive layer is likely to be melted during high-frequency dielectric heating with a bonding performance between the second adhesive layer and an adherend improved.

With the ratio MVRr1 being 20 or less, the amount of a resin protruding from the first adhesive layer at the time of bonding is likely to be reduced.

With the ratio MVRr2 being 20 or less, the amount of a resin protruding from the second adhesive layer at the time of bonding is likely to be reduced.

With the ratio MVRr1 and the ratio MVRr2 both being 0.01 or more, the bonding performances of the first adhesive layer and the second adhesive layer located in the outermost layers of the high-frequency dielectric heating adhesive sheet are improved with the bonding performances to the adherends on the opposite surfaces improved.

With the ratio MVRr1 and the ratio MVRr2 both being 20 or less, the amounts of resins protruding from the first adhesive layer and the second adhesive layer at the time of bonding are likely to be reduced.

The ratio MVRr1 and the ratio MVRr2 are the same as or different from each other.

The MVRs of the thermoplastic resin, the adhesive layer, and the intermediate layer can be measured by a method described in items regarding Examples described later.

In the high-frequency dielectric heating adhesive sheet according to the exemplary embodiment, MVRy denoting the MVR of the intermediate layer at 230 degrees C. is preferably 60 $cm^3/10$ min or less, more preferably 50 $cm^3/10$ min or less, further preferably 40 $cm^3/10$ min or less.

With the MVRy being 60 $cm^3/10$ min or less, melting of the intermediate layer caused by heat conduction from at least one of the first adhesive layer or the second adhesive layer during high-frequency dielectric heating and protrusion of a resin due to the melting of the intermediate layer are likely to be prevented.

In terms of facilitation of formation of the intermediate layer, MVRy is preferably 0.5 $cm^3/10$ min or more, more preferably 1 $cm^3/10$ min or more, further preferably 3 cm/10 min or more.

In the high-frequency dielectric heating adhesive sheet according to the exemplary embodiment, at least one of MVRx1 denoting the MVR of the first adhesive layer at 230 degrees C. or MVRx2 denoting the MVR of the second adhesive layer at 230 degrees C. is preferably 0.5 $cm^3/10$ min or more, more preferably 1 $cm^3/10$ min or more, further preferably 3 $cm^3/10$ min or more, much further preferably 5 $cm^3/10$ min or more, particularly further preferably 10 $cm^3/10$ min or more.

At least one of MVRx1 denoting the MVR of the first adhesive layer at 230 degrees C. or MVRx2 denoting the MVR of the second adhesive layer at 230 degrees C. is preferably 200 $cm^3/10$ min or less, more preferably 175 $cm^3/10$ min or less, further preferably 150 $cm^3/10$ min or less, much further preferably 100 $cm^3/110$ min or less, particularly further preferably 50 $cm^3/10$ min or less.

With the ratio MVRx1 of the first adhesive layer being 0.5 $cm^3/10$ min or more, the first adhesive layer is likely to be melted during high-frequency dielectric heating with a bonding performance between the first adhesive layer and an adherend improved.

With the ratio MVRx2 of the second adhesive layer being 0.5 $cm^3/10$ min or more, the second adhesive layer is likely to be melted during high-frequency dielectric heating with a bonding performance between the second adhesive layer and an adherend improved.

With the MVRx1 of the first adhesive layer being 200 $cm^3/10$ min or less, the amount of a resin protruding from the first adhesive layer at the time of bonding is likely to be reduced and the first adhesive layer is easily machinable.

With the MVRx2 of the second adhesive layer being 200 $cm^3/10$ min or less, the amount of a resin protruding from the second adhesive layer at the time of bonding is likely to be reduced and the second adhesive layer is easily machinable.

With the MVRx1 of the first adhesive layer and the MVRx2 of the second adhesive layer both being 0.5 $cm^3/10$ min or more, the bonding performances of the first adhesive layer and the second adhesive layer located in the outermost layers of the high-frequency dielectric heating adhesive sheet are improved with the bonding performances to the adherends on the opposite surfaces improved.

With the MVRx1 of the first adhesive layer and the MVRx2 of the second adhesive layer both being 200 $cm^3/10$ min or less, the amounts of resins protruding from the first adhesive layer and the second adhesive layer at the time of bonding are likely to be reduced and the high-frequency dielectric heating adhesive sheet is easily machinable.

The MVRx1 of the first adhesive layer and the MVRx2 of the second adhesive layer are the same as or different from each other.

Interlayer Adhesiveness

In any layer of the high-frequency dielectric heating adhesive sheet according to the exemplary embodiment, a percentage of the number of lattices adhering to a layer in contact with that layer without separation after a cross-cut test according to JIS K5600-5-6: 1999 is preferably 50% or more, more preferably 80% or more, further preferably 100%. By virtue of such an interlayer adhesiveness, separation between layers of the sheet is more unlikely to occur.

The percentage of the number of lattices adhering to a layer in contact with that layer without separation after the cross-cut test is usually 100% or less.

For instance, in a case where the high-frequency dielectric heating adhesive sheet 1 includes the first adhesive layer 10, the intermediate layer 30, and the second adhesive layer 20, the first adhesive layer is in contact with the intermediate layer 30 and the second adhesive layer is in contact with the intermediate layer 30 as illustrated in FIG. 1. In such a case, the percentage of the number of lattices of the first adhesive layer 10 adhering to the intermediate layer 30 without separation after the cross-cut test according to JIS K5600-5-6: 1999 is preferably 50% or more and the percentage of the number of lattices of the second adhesive layer 20 adhering to the intermediate layer 30 without separation is preferably 50% or more, more preferably 80% or more, further preferably 100%.

Method of Manufacturing High-Frequency Dielectric Heating Adhesive Sheet

A method of manufacturing the high-frequency dielectric heating adhesive sheet according to the exemplary embodiment is not limited as long as a stacked high-frequency dielectric heating adhesive sheet including the first adhesive layer, the intermediate layer, and the second adhesive layer can be manufactured.

The high-frequency dielectric heating adhesive sheet according to the exemplary embodiment can be manufactured by, for instance, a coextrusion technique using a multilayer extruder with the above components premixed. Alternatively, the high-frequency dielectric heating adhesive sheet according to the exemplary embodiment can also be manufactured by separately producing single-layer sheets of the layers (for instance, the first adhesive layer, the intermediate layer, and the second adhesive layer) constituting the high-frequency dielectric heating adhesive sheet according to the exemplary embodiment and subjecting the plurality of single-layer sheets to a lamination treatment to be stacked. The single-layer sheets can be manufactured by premixing the above components, kneading them using a known kneading device including an extruder and a heat roller, and using a known forming method including extrusion molding, calendering molding, injection molding, and casting molding. To subject the plurality of single-layer sheets to the lamination treatment, for instance, a heat laminator is used.

Usage of High-Frequency Dielectric Heating Adhesive Sheet

Using the high-frequency dielectric heating adhesive sheet according to the exemplary embodiment, for instance, the first adherend and the second adherend can be bonded to each other.

It is preferable that the high-frequency dielectric heating adhesive sheet according to the exemplary embodiment be a sheet for bonding the first adherend and the second adherend, which is different in material from the first adherend, to each other.

It is preferable that the first adherend and the second adherend be, without limitation, in the form of a sheet. The shape of the first adherend and the second adherend only have to include materials as described above and the shape of the first adherend and the shape and size of the second adherend may be the same as or different from each other.

Regarding how to use the high-frequency dielectric heating adhesive sheet according to the exemplary embodiment, the high-frequency dielectric heating adhesive sheet according to the exemplary embodiment is sandwiched between the first adherend and the second adherend and, for instance, a high-frequency voltage in a range from 3 MHz to 300 MHz is applied thereto, which makes it possible to produce a joined body of the bonded first adherend and second adherend.

Bonding Method

In a bonding method according to the exemplary embodiment, the high-frequency dielectric heating adhesive sheet according to the exemplary embodiment is used to bond, for instance, the first adherend and the second adherend to each other.

It is preferable that the bonding method according to the exemplary embodiment include following Step P1 and Step P2.

Step P1: a step of bringing the first adhesive layer of the high-frequency dielectric heating adhesive sheet into contact with the first adherend and the second adhesive layer into contact with the second adherend Step P2: a step of applying a high-frequency wave to the high-frequency dielectric heating adhesive sheet to bond the first adherend and the second adherend to each other Step P1

Step P1 is a step of sandwiching the high-frequency dielectric heating adhesive sheet according to the exemplary embodiment between the first adherend and the second adherend. In Step P1, the first adherend is brought into contact with the first adhesive layer of the high-frequency dielectric heating adhesive sheet. In addition, in Step P1, the second adherend is brought into contact with the second adhesive layer of the high-frequency dielectric heating adhesive sheet.

The high-frequency dielectric heating adhesive sheet only has to be sandwiched between the first adherend and the second adherend such that the first adherend and the second adherend can be bonded to each other. The high-frequency dielectric heating adhesive sheet only has to be sandwiched between parts of the first adherend and the second adherend at a plurality of spots or all over the surfaces. In terms of improvement in bonding strength between the first adherend and the second adherend, it is preferable that the high-frequency dielectric heating adhesive sheet be sandwiched between and across the bonded surfaces of the first adherend and the second adherend. In addition, examples of implementation where the high-frequency dielectric heating adhesive sheet is sandwiched between the parts of the first adherend and the second adherend include the high-frequency dielectric heating adhesive sheet being placed in a frame form along outer peripheries of the bonded surfaces of the first adherend and the second adherend to be sandwiched between the first adherend and the second adherend. With the high-frequency dielectric heating adhesive sheet being placed in the form of a frame, the bonding strength between the first adherend and the second adherend is obtainable and the joined body can be reduced in weight as compared with in a case where the high-frequency dielectric heating adhesive sheet is placed across the bonded surfaces. In addition, in the implementation where the high-frequency dielectric heating adhesive sheet is sandwiched between the parts of the first adherend and the second adherend, the size of the high-frequency dielectric heating adhesive sheet in use can be reduced, enabling reducing a high-frequency dielectric heating treatment time as compared with in a case where the high-frequency dielectric heating adhesive sheet is sandwiched across the bonded surfaces.

Step P2

Step P2 is a step of applying a high-frequency voltage in a range from 3 MHz to 300 MHz to the high-frequency dielectric heating adhesive sheet sandwiched between the first adherend and the second adherend in Step P1 to bond the first adherend and the second adherend using the high-frequency dielectric heating adhesive sheet.

For instance, the high-frequency voltage can be applied to the high-frequency dielectric heating adhesive sheet using a dielectric heating bonding device.

Figure 2:
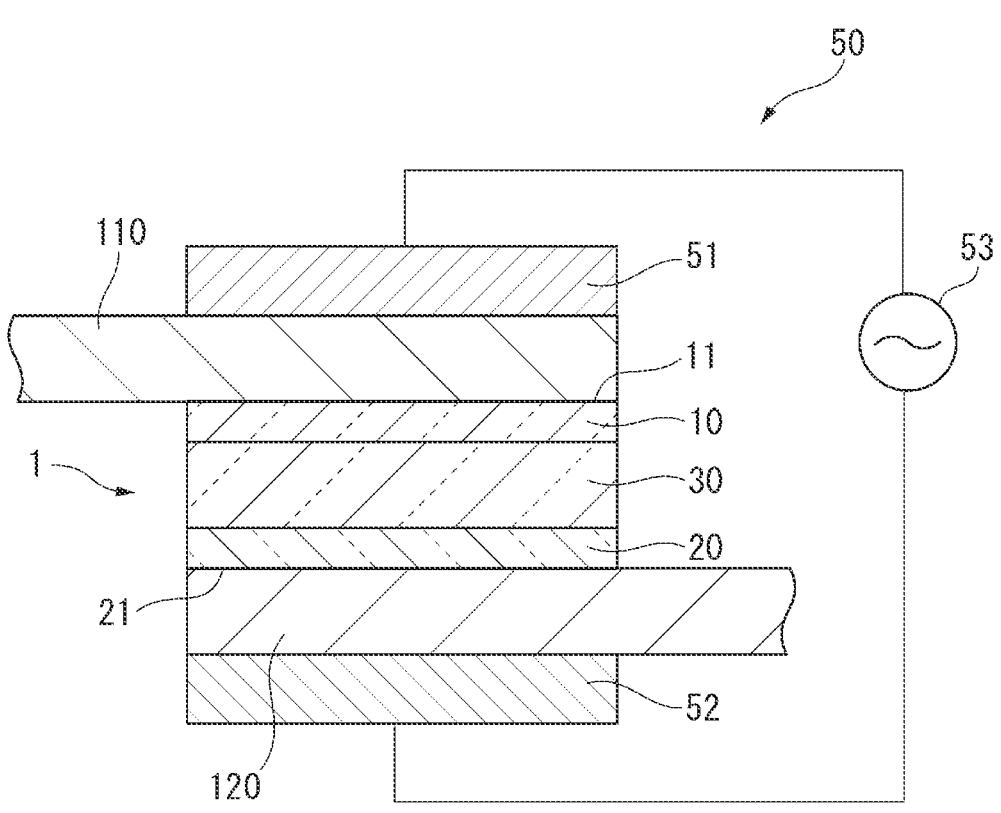
FIG. 2 is a schematic diagram for explaining a high-frequency dielectric heating treatment using the high-frequency dielectric heating adhesive sheet according to the exemplary embodiment and a dielectric heating device.

FIG. 2 illustrates a schematic diagram for explaining a high-frequency dielectric heating treatment using the high-frequency dielectric heating adhesive sheet according to the exemplary embodiment and a dielectric heating device.

Dielectric Heating Bonding Device

FIG. 2 illustrates a schematic diagram of a dielectric heating bonding device 50.

The dielectric heating bonding device 50 includes a first high-frequency application electrode 51, a second high-frequency application electrode 52, and a high-frequency power source 53.

The first high-frequency application electrode 51 and the second high-frequency application electrode 52 are opposed to each other. The first high-frequency application electrode 51 and the second high-frequency application electrode 52 include a press mechanism. The press mechanism enables a first adherend 110, the high-frequency dielectric heating adhesive sheet 1, and a second adherend 120 to be subjected to a pressure treatment between the first high-frequency application electrode 51 and the second high-frequency application electrode 52.

In a case where the first high-frequency application electrode 51 and the second high-frequency application electrode 52 are in the form of a pair of plate electrodes parallel with each other, such a manner of electrode arrangement is sometimes referred to as a parallel-plate type.

It is also preferable that a parallel-plate high-frequency dielectric heating device be used to apply a high-frequency wave. The parallel-plate high-frequency dielectric heating device causes a high-frequency wave to penetrate through the high-frequency dielectric heating adhesive sheet placed between the electrodes, enabling heating the whole of the high-frequency dielectric heating adhesive sheet and bonding the adherends and the high-frequency dielectric heating adhesive sheet in a short time.

The first high-frequency application electrode 51 and the second high-frequency application electrode 52 are each connected to the high-frequency power source 53 for applying a high-frequency voltage having, for instance, a frequency of approximately 13.56 MHz, approximately 27.12 MHz, or a frequency of approximately 40.68 MHz.

The dielectric heating bonding device 50 performs a dielectric heating treatment through the high-frequency dielectric heating adhesive sheet 1 sandwiched between the first adherend 110 and the second adherend 120 as illustrated in FIG. 2. Further, the dielectric heating bonding device 50 performs, in addition to the dielectric heating treatment, the pressure treatment using the first high-frequency application electrode 51 and the second high-frequency application electrode 52 to bond the first adherend 110 and the second adherend 120 to each other. It should be noted that the first adherend 110 and the second adherend 120 may be bonded to each other without performing the pressure treatment.

In a case where the first adhesive layer and the second adhesive layer of the high-frequency dielectric heating adhesive sheet 1 contain dielectric fillers (not illustrated), the dielectric fillers absorb a high-frequency wave energy when a high-frequency electric field is applied to between the first high-frequency application electrode 51 and the second high-frequency application electrode 52.

The dielectric fillers then function as a heat generation source. The heat generation of the dielectric fillers causes thermoplastic resin components in the first adhesive layer and the second adhesive layer to melt, eventually enabling the first adherend 110 and the second adherend 120 to be firmly bonded even through the short-time treatment. In a case where the adhesive layers contain no dielectric filler, a thermoplastic resin that can generate heat in response to a high-frequency wave is used and the thermoplastic resin is caused to function as a heat generation source.

The first high-frequency application electrode 51 and the second high-frequency application electrode 52, which include the press mechanism, also function as a press device. Thus, by virtue of application of pressure in compression directions by the first high-frequency application electrode 51 and the second high-frequency application electrode 52 and heating and melting by the high-frequency dielectric heating adhesive sheet 1, the first adherend 110 and the second adherend 120 can be more firmly bonded to each other.

High-Frequency Dielectric Heating Bonding Conditions

High-frequency dielectric heating bonding conditions are changeable as appropriate but the following conditions are preferable.

A high-frequency output is preferably 10 W or more, more preferably 30 W or more, further preferably 50 W or more, much further preferably 80 W or more.

The high-frequency output is preferably 50,000 W or less, more preferably 20,000 W or less, further preferably 15,000 W or less, much further preferably 10,000 W or less, particularly further preferably 1,000 W or less.

With the high-frequency output being 10 W or more, a problem of unlikeliness for the temperature to increase during the dielectric heating treatment can be prevented and thus a favorable bonding force is likely to be obtained.

With the high-frequency output being 50,000 W or less, a problem of a difficulty of a temperature control by the dielectric heating treatment is likely to be prevented.

An application time of the high-frequency wave is preferably one second or more.

The application time of the high-frequency wave is preferably 60 seconds or less, more preferably 45 seconds or less, further preferably 35 seconds or less, much further preferably 25 seconds or less, particularly further preferably 10 seconds or less.

With the application time of the high-frequency wave being one second or more, a problem of unlikeliness for the temperature to increase during the dielectric heating treatment can be prevented and thus a favorable bonding force is likely to be obtained.

With the application time of the high-frequency wave being 60 seconds or less, problems of a decrease in efficiency in manufacturing the joined body of the bonded first adherend and second adherend, an increase in manufacturing costs of the joined body, and even deterioration of the adherends by heat are likely to be prevented.

A frequency of the high-frequency wave to be applied is preferably 1 kHz or more, more preferably 1 MHz or more, further preferably 5 MHz or more, much further preferably 10 MHz or more.

The frequency of the high-frequency wave to be applied is preferably 300 MHz or less, more preferably 100 MHz or less, further preferably 80 MHz or less, much further preferably 50 MHz or less. Specifically, an industrial frequency band 13.56 MHz, 27.12 MHz, or 40.68 MHz, which is designated by the International Telecommunication Union, is also usable for the high-frequency dielectric heating bonding method (the bonding method) of the exemplary embodiment.

The high-frequency dielectric heating adhesive sheet according to the exemplary embodiment has a multilayer configuration, including the first adhesive layer and the second adhesive layer as the outermost layers and the intermediate layer between the first adhesive layer and the second adhesive layer. Further, with the dielectric property ratios DPM/DP1 and DPM/DP2 each being less than one, during application of a high-frequency wave, the first adhesive layer and the second adhesive layer located as the outermost layers of the high-frequency dielectric heating adhesive sheet are likely to melt, whereas the intermediate layer located on the internal side of the sheet is unlikely to melt. Thus, application of a pressure to the high-frequency dielectric heating adhesive sheet between adherends during dielectric heating bonding is unlikely to cause the thermoplastic resin to protrude from between stuck portions of the adherends. By virtue of the intermediate layer, which is smaller in dielectric property and more unlikely to melt than the first adhesive layer and the second adhesive layer, being located between the first adhesive layer and the second adhesive layer being brought into contact with adherends, the outermost layers, or the first adhesive layer and the second adhesive layer, are preferentially heated during application of a high-frequency wave. As a result, regarding the high-frequency dielectric heating adhesive sheet according to the exemplary embodiment, protrusion of the thermoplastic resins in the first adhesive layer and the second adhesive layer is reduced and a problem of causing the entire adherends to melt at the time of bonding to the adherends is likely to be prevented.

The high-frequency dielectric heating adhesive sheet according to the exemplary embodiment is not only easy to handle as compared with in a case where an adhesive agent that needs to be applied is used but also improved in workability in bonding to the first adherend and the second adherend. The high-frequency dielectric heating adhesive sheet according to the exemplary embodiment can be bonded to the adherends by applying a high-frequency wave for a short time.

The high-frequency dielectric heating adhesive sheet according to the exemplary embodiment is excellent in water resistance and moisture resistance as compared with a typical sticky agent.

The high-frequency dielectric heating adhesive sheet according to the exemplary embodiment, which contains no solvent, is likely to be free from a VOC (Volatile Organic Compounds) matter attributed to an adhesive agent used for bonding to an adherend.

The bonding method using the high-frequency dielectric heating adhesive sheet according to the exemplary embodiment enables only a predetermined spot to be externally locally heated using a dielectric heating bonding device. Accordingly, even in a case where an adherend is in the form of a large-sized and complicated three-dimensional structure, a thickened and complicated three-dimensional structure, or the like and, further, a high dimensional accuracy is required, the bonding method using the high-frequency dielectric heating adhesive sheet according to the exemplary embodiment is beneficial.

In addition, regarding the high-frequency dielectric heating adhesive sheet according to the exemplary embodiment, the thickness and the like of the high-frequency dielectric heating adhesive sheet can be controlled as appropriate. Accordingly, the high-frequency dielectric heating adhesive sheet according to the exemplary embodiment is also usable in a roll-to-roll system and the high-frequency dielectric heating adhesive sheet can be machined to have desired area and shape by punching or the like in accordance with an area of bonding to an adherend and a shape of the adherend. Accordingly, the high-frequency dielectric heating adhesive sheet according to the exemplary embodiment is also significantly advantageous in terms of manufacturing process.

Modifications of Exemplary Embodiment

The invention is not limited to the above exemplary embodiment. The invention can include modifications, improvements, and the like as long as they are compatible with the object of the invention.

In the exemplary embodiment, the high-frequency dielectric heating adhesive sheet including only three layers, i.e., the first adhesive layer, the second adhesive layer, and the intermediate layer, is described by way of example; however, the invention is not limited to such an example. Examples of the implementation of the invention include a high-frequency dielectric heating adhesive sheet including the first adhesive layer and the second adhesive layer, each of which is the outermost layer, and another layer in addition to the first adhesive layer, the second adhesive layer, and the intermediate layer. A high-frequency dielectric heating adhesive sheet including four or more layers in total is also included as an implementation of the invention.

The high-frequency dielectric heating adhesive sheet may have a sticky portion. By virtue of having the sticky portion, the high-frequency dielectric heating adhesive sheet can be placed at an accurate position with an offset in position prevented when sandwiched between adherends. The sticky portion may be provided in one surface of the high-frequency dielectric heating adhesive sheet or in each of the opposite surfaces. In addition, the sticky portion may be provided at a part of the surface or surfaces of the high-frequency dielectric heating adhesive sheet. The high-frequency dielectric heating adhesive sheet enables firmly bonding the first adherend and the second adherend even though having no sticky portion.

For the high-frequency dielectric heating treatment, the dielectric heating bonding device including the opposed electrodes described in the above exemplary embodiment is not limiting and a lattice-electrode high-frequency dielectric heating device may be used. The lattice-electrode high-frequency dielectric heating device includes a lattice electrode including an electrode having a first polarity and another electrode having a second polarity alternately arranged at regular intervals in the same plane, the second polarity being opposite to the first polarity.

For instance, in manufacturing a joined body of the first adherend and the second adherend bonded with respective end portions thereof overlapped each other, the lattice-electrode high-frequency dielectric heating device is placed on a first adherend side or on a second adherend side and a high-frequency wave is applied.

In bonding the first adherend and the second adherend to each other using the lattice-electrode high-frequency dielectric heating device, high-frequency waves may be simultaneously applied from a first lattice electrode placed on the first adherend side and a second lattice electrode placed on the second adherend side with the first adherend, the high-frequency dielectric heating adhesive sheet, and the second adherend sandwiched between the first lattice electrode and the second lattice electrode.

In bonding the first adherend and the second adherend to each other using the lattice-electrode high-frequency dielectric heating device, after a high-frequency wave is applied with the lattice electrode placed on one surface side of the first adherend and the second adherend, a high-frequency wave may be applied with the lattice electrode placed on the other surface side of the first adherend and the second adherend.

It is also preferable that the lattice-electrode high-frequency dielectric heating device be used to apply a high-frequency wave. By virtue of the use of the lattice-electrode high-frequency dielectric heating device, dielectric heating can be applied from a front-layer side of the first adherend and the second adherend, for instance, an adherend side less distant to the high-frequency dielectric heating adhesive sheet, with no influence of the thicknesses of the first adherend and the second adherend to bond the adherends to each other. In addition, by virtue of the use of the lattice-electrode high-frequency dielectric heating device, an energy for manufacturing the joined body can be saved.

It should be noted that the figures illustrate by way of example an implementation where the dielectric heating bonding device including the opposed electrodes is used for the purpose of simplification.

EXAMPLES

The invention will be described below in further detail with reference to Examples. The invention is by no means limited to these Examples.
Method of Producing High-Frequency Dielectric Heating Adhesive Sheet Example 1

A material for forming the first adhesive layer and a material for forming the second adhesive layer were individually premixed in separate containers in compositions (vol %) shown in Table 1. Granular pellets of the types of resins shown in Table 1 were prepared as a material for forming the intermediate layer. Zinc oxide was mixed as the dielectric fillers with the materials for forming the first adhesive layer and the second adhesive layer, whereas the material for forming the intermediate layer contained no dielectric filler. PP in Table 1 is an abbreviation of polypropylene.
PP: manufactured by Prime Polymer Co., Ltd., product name "Prime Polypro F-744NP"

The premixed material was supplied to a hopper of a 30-mm-diameter twin-screw extruder and the premixed material was melted and kneaded with a set temperature of a cylinder set in a range from 180 degrees C. to 200 degrees C. and a die temperature set at 200 degrees C., thereby producing granular pellets. Respective granular pellets for the first adhesive layer and the second adhesive layer were produced. Subsequently, the granular pellets for the first adhesive layer, the second adhesive layer, and the intermediate layer were individually loaded in a hopper of a single-screw multilayer extruder equipped with a T-die including a feed block. A film-shaped melted and kneaded substance was extruded from the T-die under the conditions of a cylinder temperature of 200 degrees C. and a die temperature of 200 degrees C. and cooled using a cooling roll, thereby producing a 400-μm-thick high-frequency dielectric heating adhesive sheet having a multilayer configuration where the first adhesive layer, the intermediate layer, and the second adhesive layer were stacked in this sequence.

Example 2 to Example 17

High-frequency dielectric heating adhesive sheets according to Example 2 to Example 17 were produced in a similar manner to that of Example 1 except that the compositions and thicknesses of the first adhesive layer, the second adhesive layer, and the intermediate layer were changed as shown in Table 1 and, further, temperatures during premixing and extrusion molding were set as appropriate in accordance with the types of resins contained in the layers of the high-frequency dielectric heating adhesive sheets. In the high-frequency dielectric heating adhesive sheet according to Example 10, zinc oxide (ZnO) was blended as a dielectric filler in the intermediate layer. Accordingly, granular pellets for the intermediate layer were produced as for the first adhesive layer and the granular pellets were used to produce the high-frequency dielectric heating adhesive sheet according to Example 10. In Example 16, m-PP was used as the first thermoplastic resin and PP was used as the second thermoplastic resin.

Table 1 also shows total thicknesses of the produced high-frequency dielectric heating adhesive sheets.

Comparative Example 1 and Comparative Example 2

A sheet consisting of an intermediate layer having a composition and a thickness shown in Table 1 was produced as a sheet according to each of Comparative Example 1 and Comparative Example 2.

EVA in Table 1 is an abbreviation of an ethylene-vinyl-acetate copolymer, PE is an abbreviation of polyethylene, m-PP is an abbreviation of maleic-anhydride-modified polypropylene, and m-PE is an abbreviation of maleic-anhydride-modified polyethylene.
EVA1: manufactured by Tosoh Corporation, product name "ULTRATHENE 510"
EVA2: manufactured by DuPont-Mitsui Polychemicals Co., Ltd., product name "EVAFLEX EV550"
m-PP: manufactured by Mitsubishi Chemical Corporation, product name "Modic P565"
m-PE: manufactured by Mitsubishi Chemical Corporation, product name "Modic M545"

TABLE 1

| | First and Second Adhesive Layers | | | | | | | Intermediate Layer | | | | | | | |
| | First and Second Thermoplastic Resins | | First and Second Dielectric Fillers | | Di-electric Charac-teristics | MVRx1 and MVRx2 | Thick-nesses Tx1 and Tx2 | Thermoplastic Resin | | Dielectric Filler | | Di-electric Charac teristics | MVRy | Thick-ness Ty | Total Thick-ness of Sheet |
| | Type | Blend-ing Amount [vol %] | Type | Blen-ding Amount [vol %] | [—] | [cm³/10 min] | [μm] | Type | Blend-ing Amount [vol %] | Type | Blend-ing Amount [vol %] | [—] | [cm³/10 min] | [μm] | [μm] |
|---|---|---|---|---|---|---|---|---|---|---|---|---|---|---|---|
| Ex. 1 | PP | 80 | ZnO | 20 | 0.015 | 19.2 | 25 | PP | 100 | — | 0 | 0 | 27.9 | 350 | 400 |
| Ex. 2 | PP | 80 | ZnO | 20 | 0.015 | 19.2 | 50 | PP | 100 | — | 0 | 0 | 27.9 | 300 | 400 |
| Ex. 3 | PP | 80 | ZnO | 20 | 0.015 | 19.2 | 100 | PP | 100 | — | 0 | 0 | 27.9 | 200 | 400 |
| Ex. 4 | PP | 80 | ZnO | 20 | 0.015 | 19.2 | 25 | PP | 100 | — | 0 | 0 | 27.9 | 150 | 200 |
| Ex. 5 | PP | 80 | ZnO | 20 | 0.015 | 19.2 | 100 | PP | 100 | — | 0 | 0 | 27.9 | 600 | 800 |

TABLE 1-continued

| | First and Second Adhesive Layers | | | | | | Intermediate Layer | | | | | | | |
| | First and Second Thermoplastic Resins | | First and Second Dielectric Fillers | | Dielectric Characteristics | MVRx1 and MVRx2 | Thicknesses | Thermoplastic Resin | | Dielectric Filler | | Dielectric Characteristics | MVRy | Thickness | Total Thickness |
| | Type | Blending Amount [vol %] | Type | Blending Amount [vol %] | [—] | MVRx2 [cm³/ 10 min] | Tx1 and Tx2 [μm] | Type | Blending Amount [vol %] | Type | Blending Amount [vol %] | [—] | [cm³/ 10 min] | Ty [μm] | of Sheet [μm] |
|---|---|---|---|---|---|---|---|---|---|---|---|---|---|---|---|
| Ex. 6 | EVA1 | 80 | ZnO | 20 | 0.017 | 14.5 | 50 | EVA1 | 100 | — | 0 | 0.003 | 32.0 | 300 | 400 |
| Ex. 7 | m-PP | 80 | ZnO | 20 | 0.015 | 19.4 | 50 | m-PP | 100 | — | 0 | 0 | 33.8 | 300 | 400 |
| Ex. 8 | m-PE | 80 | ZnO | 20 | 0.015 | 13.6 | 50 | m-PE | 100 | — | 0 | 0 | 34.0 | 300 | 400 |
| Ex. 9 | m-PP | 80 | ZnO | 20 | 0.015 | 19.4 | 50 | PP | 100 | — | 0 | 0 | 27.9 | 300 | 400 |
| Ex. 10 | PP | 80 | ZnO | 20 | 0.015 | 19.2 | 50 | PP | 98 | ZnO | 2 | 0.002 | 26.1 | 300 | 400 |
| Ex. 11 | PP | 90 | ZnO | 10 | 0.010 | 24.0 | 50 | PP | 100 | — | 0 | 0 | 27.9 | 300 | 400 |
| Ex. 12 | PP | 50 | ZnO | 50 | 0.025 | 5.1 | 50 | PP | 100 | — | 0 | 0 | 27.9 | 300 | 400 |
| Ex. 13 | PP | 80 | ZnO | 20 | 0.015 | 19.2 | 150 | PP | 100 | — | 0 | 0 | 27.9 | 100 | 400 |
| Ex. 14 | PP | 80 | ZnO | 20 | 0.015 | 19.2 | 15 | PP | 100 | — | 0 | 0 | 27.9 | 370 | 400 |
| Ex. 15 | PP | 95 | ZnO | 5 | 0.005 | 36.0 | 50 | PP | 100 | — | 0 | 0 | 27.9 | 300 | 400 |
| Ex. 16 | m-PP/ PP | 80 | ZnO | 20 | 0.015/ 0.015 | 19.4/ 19.2 | 50 | PP | 100 | — | 0 | 0 | 27.9 | 300 | 400 |
| Ex. 17 | EVA2 | 95 | ZnO | 5 | 0.010 | 120.0 | 50 | EVA1 | 100 | — | 0 | 0.003 | 32.0 | 300 | 400 |
| Comp. 1 | — | — | — | — | — | — | — | PP | 80 | ZnO | 20 | 0.015 | 19.2 | 400 | 400 |
| Comp. 2 | — | — | — | — | — | — | — | PP | 100 | — | 0 | 0 | 11.2 | 400 | 400 |

Evaluation of High-Frequency Dielectric Heating Adhesive Sheets

The high-frequency dielectric heating adhesive sheets were evaluated as follows. Table 1 or 2 shows evaluation results.

Dielectric Property tanδ/ε'r

Using the respective granular pellets for the first adhesive layer, the second adhesive layer, and the intermediate layer, the first adhesive layer, the second adhesive layer, and the intermediate layer were separately produced. The first adhesive layer, the second adhesive layer, and the intermediate layer were each cut into a size of 30 mm×30 mm. The cut first adhesive layer, second adhesive layer, and intermediate layer were subjected to measurement of each of the relative permittivity (ε'r) and the dielectric dissipation factor (tanδ) under conditions of a frequency of 40.68 MHz at 23 degrees C. by a parallel plate method with a dielectric material test fixture 16453A (manufactured by Agilent Technologies, Inc.) attached to an RF impedance material analyzer E4991A (manufactured by Agilent Technologies, Inc.). A value of dielectric property (tanδ/ε'r) was calculated on the basis of results of the measurement. In Table 2, DPM denotes the dielectric property of the intermediate layer, DP1 denotes the dielectric property of the first adhesive layer, and DP2 denotes the dielectric property of the second adhesive layer.

It should be noted that "0.015/0.015" of Example 16 in Table 1 indicates that the dielectric property DP1 is 0.015 and the dielectric property DP2 is 0.015.

MVR (Melt Volume-Flow Rate)

The MVR of a measurement sample (the thermoplastic resin, the adhesive layer, or the intermediate layer) was measured with test conditions according to JIS K 7210-1: 2014 changed as follows.

Test Temperature: 230 degrees C.

Load: 5 kg

Die: hole shape diameter 2.0 mm, length 5.0 mm

Cylinder Diameter: 11.329 mm

It should be noted that "19.4/19.2" of Example 16 in Table 1 indicates that MVRx1 is 19.4 cm³/10 min and MVRx2 is 19.4 cm³/10 min.

High-Frequency Wave Bonding Performance

The produced high-frequency dielectric heating adhesive sheet or the like was cut into a size of 25 mm×12.5 mm. A first adherend and a second adherend of a glass-fiber-reinforced polypropylene resin were prepared (glass-fiber-reinforced polypropylene is sometimes abbreviated as GFRPP). The sizes of the first adherend and the second adherend were each 25 mm×100 mm×1.5 mm (thickness). The high-frequency dielectric heating adhesive sheet cut into the above size was sandwiched between the first adherend and the second adherend. The first adherend, the high-frequency dielectric heating adhesive sheet, and the second adherend were fixed between electrodes of a high-frequency dielectric heating device (manufactured by Yamamoto Vinita Co., Ltd., "YRP-400T-A"). A high-frequency wave was applied to the high-frequency dielectric heating adhesive sheet in a fixed state under the following conditions for application of a high-frequency wave to be bonded to the adherends, thereby producing a test piece for evaluation of high-frequency wave bonding performance.

Conditions for Application of High-Frequency Wave

Frequency: 40.68 MHz

Output: 200 W

Application Time: 10 seconds

Pushing Pressure: 0.5 MPa

The pushing pressure during application of a high-frequency wave refers to a pressure applied to joints to the first adherend and the second adherend.

Protrusiveness

A test piece for evaluation of protrusiveness was produced by bonding a high-frequency dielectric heating adhesive sheet and adherends as in "Evaluation of High-Frequency Wave Bonding Performance" described above except that in producing the test piece for evaluation of high-frequency wave bonding performance in "Evaluation of High-Frequency Wave Bonding Performance" described above, a first adherend and second adherend of a glass-fiber-reinforced epoxy resin were used and conditions for application of a high-frequency wave were changed as follows. The sizes of the first adherend and the second adherend were each 25 mm×100 mm×1.5 mm.

Conditions for Application of High-Frequency Wave

Frequency: 40.68 MHz

Output: 100 W

Application Time: 10 seconds

Pushing Pressure: 0.5 MPa

The pushing pressure refers to a pressure applied to joints to the first adherend and the second adherend.

Figure 3:
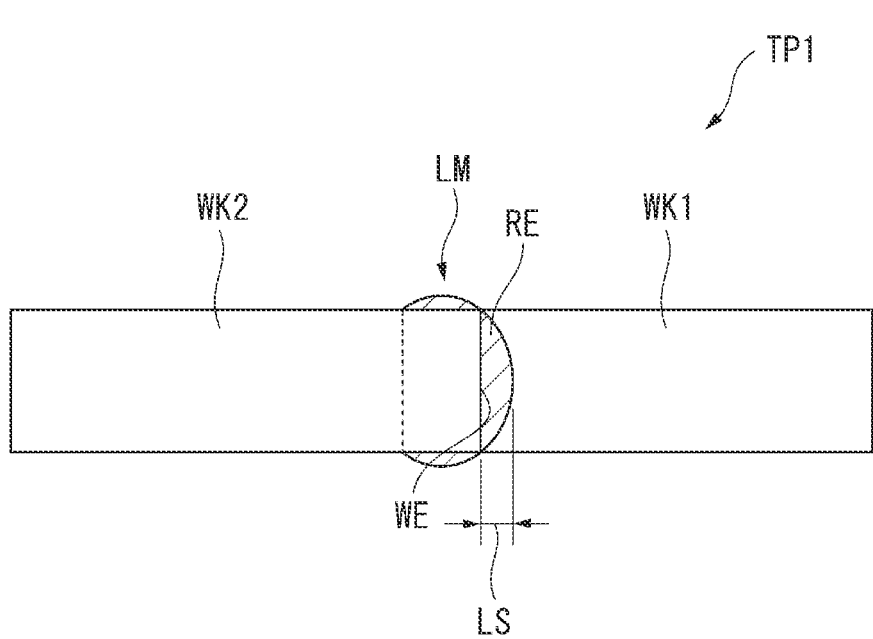
FIG. 3 is a schematic plan view of a test piece used for evaluation of protrusiveness.
Figure 4:
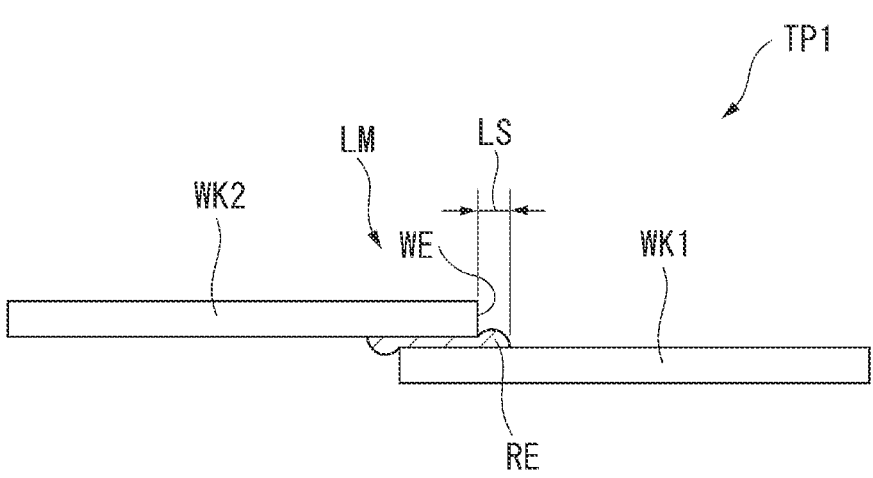
FIG. 4 is a schematic cross sectional view of the test piece used for evaluation of protrusiveness.

FIG. 3 illustrates a schematic plan view of a test piece TP1 used for evaluation of protrusiveness and FIG. 4 illustrates a schematic cross sectional view of the test piece TP1. The produced test piece TP1 for evaluation of protrusiveness had a stuck portion LM of an adherend WK1 located on a lower side and an adherend WK2 located on an upper side, which was observed from a planar direction (a side including the adherend WK2 located on the upper side). With a thermoplastic resin RE protruding out of an end portion WE of the adherend WK2 located on the upper side, a maximum length LS, or straight line parallel with a long side of the adherend WK1, of the thermoplastic resin RE protruding on the adherend WK1 located on the lower side was measured.

The protrusiveness of the high-frequency dielectric heating adhesive sheet was evaluated in line with the following evaluation criteria.

A: the maximum length LS of the protruding resin was less than 1.5 mm.

F: the maximum length LS of the protruding resin was equal to or more than 1.5 mm.

Regarding a test piece produced using the high-frequency dielectric heating adhesive sheet of Comparative Example 1, the longitudinal length LS of a protruding resin was 3.1 mm.

Thickness Decrease Rate

A test piece for evaluation of thickness decrease rate was produced by bonding a high-frequency dielectric heating adhesive sheet and adherends as in producing the test piece for "Evaluation of Protrusiveness" described above.

A thickness D1 of the produced high-frequency dielectric heating adhesive sheet before application of a high-frequency wave and a thickness D2 of a portion corresponding to the high-frequency dielectric heating adhesive sheet in the test piece for evaluation of thickness decrease rate were measured. The thicknesses of the high-frequency dielectric heating adhesive sheet were measured using "constant pressured thickness measuring instrument PG02J" manufactured by TECLOCK Co., Ltd.

The thickness D2 is a value determined by measuring a thickness of a joint part of the test piece for evaluation of thickness decrease rate including the adherends and subtracting the thicknesses of the adherends from the measured value. A thickness measurement spot was a middle portion of the test piece in a plan view and the number of measurements was five. In a case where the number of measurements was five, the thickness was an average of five measurement values. The thickness decrease rate was calculated by the following expression (Expression 4).

$$\{(D1-D2)/D1\}\times100 \qquad \text{(Expression 4)}$$

In the above expression (Expression 4), a unit of D1 and D2 is μm.

Bonding Force (Tensile Shear Force)

The test piece for evaluation of high-frequency wave bonding performance obtained for evaluation of high-frequency wave bonding performance was subjected to measurement of a bonding force, or tensile shear force. For measurement of the tensile shear force, a universal tensile tester (manufactured by Instron Corporation, INSTRON 5581) was used. Regarding conditions for measurement of the tensile shear force, a tension rate was 100 mm/min. The tensile shear force was measured in accordance with JIS K 6850: 1999.

The bonding force of the high-frequency dielectric heating adhesive sheet was evaluated in line with the following evaluation criteria.

A: the tensile shear force exceeded 4 MPa.

B: the tensile shear force exceeded 2 MPa.

F: the tensile shear force was equal to or less than 2 MPa.

Interlayer Adhesiveness

The produced high-frequency dielectric heating adhesive sheet was subjected to a cross-cut test according to JIS K5600-5-6: 1999 to evaluate interlayer adhesiveness. Specifically, a surface of the high-frequency dielectric heating adhesive sheet was corona-treated (200 W·min/m²) and a PET film (manufactured by TOYOBO CO., LTD., product name "Cosmo Shine A4300") was stuck to the corona-treated surface of the sheet using a double-faced sticky sheet (manufactured by LINTEC Corporation, TL-52BM-05) with cuts reaching a sticky agent layer made at 2-mm intervals. It should be noted that cuts in a test piece with the PET film stuck on a first adhesive layer side were made from a second adhesive layer side thereof, whereas cuts in a test piece with the PET film stuck on a second adhesive layer side were made from a first adhesive layer side thereof.

In each of the layers of the high-frequency dielectric heating adhesive sheet, the percentage of the number of lattices adhering without separation to one of the layers being in contact with that layer after the cross-cut test was observed and the interlayer adhesiveness was evaluated in line with the following evaluation criteria. Table 2 shows results of evaluation of the interlayer adhesiveness.

Evaluation Criteria

Evaluation A: the percentage of the number of lattices in the first adhesive layer adhering without separation to the intermediate layer being in contact with the first adhesive layer and the percentage of the number of lattices in the second adhesive layer adhering without separation to the intermediate layer being in contact with the second adhesive layer were 50% or more.

Evaluation F: at least one of the percentage of the number of lattices in the first adhesive layer adhering without separation to the intermediate layer being in contact with the first adhesive layer or the percentage of the number of lattices in the second adhesive layer adhering without separation to the intermediate layer being in contact with the second adhesive layer was less than 50%.

It should be noted that Evaluation A was given to each of the high-frequency dielectric heating adhesive sheets of Examples 1 to 17 and the remaining number of lattices was 100%.

Volume Average Particle Diameter of Dielectric Filler

The particle size distribution of the dielectric filler was measured by laser diffraction/scattering. The volume average particle diameter was calculated from a result of the measurement of particle size distribution in accordance with JIS Z 8819-2: 2001. The calculated average particle diameter (volume average particle diameter) of the dielectric filler (ZnO: zinc oxide) was 11 μm.

TABLE 2

| | Sheet-Thickness | Dielectric Characteristics Ratio | | MVR Ratio | | Evaluation | | | |
|---|---|---|---|---|---|---|---|---|---|
| | Ratio Trx*[1] | DPM/DP1 | DPM/DP2 | MVRr1 | MVRr2 | Protrusiveness | Decrease Rate Thickness [%] | Bonding Performance | Interlayer Adhesiveness |
| Ex. 1 | 12.5 | 0 | 0 | 0.7 | 0.7 | A | 8 | A | A |
| Ex. 2 | 25 | 0 | 0 | 0.7 | 0.7 | A | 15 | A | A |
| Ex. 3 | 50 | 0 | 0 | 0.7 | 0.7 | A | 38 | A | A |
| Ex. 4 | 25 | 0 | 0 | 0.7 | 0.7 | A | 16 | A | A |
| Ex. 5 | 25 | 0 | 0 | 0.7 | 0.7 | A | 17 | A | A |
| Ex. 6 | 25 | 0.176 | 0.176 | 0.5 | 0.5 | A | 15 | A | A |
| Ex. 7 | 25 | 0 | 0 | 0.6 | 0.6 | A | 18 | A | A |
| Ex. 8 | 25 | 0 | 0 | 0.4 | 0.4 | A | 15 | A | A |
| Ex. 9 | 25 | 0 | 0 | 0.7 | 0.7 | A | 19 | A | A |
| EX. 10 | 25 | 0.133 | 0.133 | 0.7 | 0.7 | A | 18 | A | A |
| Ex. 11 | 25 | 0 | 0 | 0.9 | 0.9 | A | 18 | A | A |
| Ex. 12 | 25 | 0 | 0 | 0.2 | 0.2 | A | 17 | A | A |
| Ex. 13 | 75 | 0 | 0 | 0.7 | 0.7 | A | 48 | A | A |
| Ex. 14 | 7.5 | 0 | O | 0.7 | 0.7 | A | 6 | B | A |
| Ex. 15 | 25 | 0 | 0 | 1.3 | 1.3 | A | 19 | B | A |
| Ex. 16 | 25 | 0 | 0 | 0.7 | 0.7 | A | 15 | A | A |
| Ex. 17 | 25 | 0.300 | 0.300 | 3.8 | 3.8 | A | 21 | A | A |
| Comp. 1 | — | — | — | — | — | F | 68 | A | — |
| Comp. 2 | — | — | — | — | — | A | 0 | F | — |

The sheet-thickness ratio Trx indicated with *[1] in Table 2 is a value calculated by $\{(Tx1+Tx2)/(Tx1+Tx2+Ty)\}\times100$.

Each of the high-frequency dielectric heating adhesive sheets according to toe examples 1 to 17, in which the dielectric property ratios DPM/DP1 and DPM/DP2 were each less than one, had a reduced amount of protrusion of the thermoplastic resin from between the stuck portions of adherends even when pressure was applied during dielectric heating bonding.

In contrast, the high-frequency dielectric heating adhesive sheet according to Comparative Example 1, which was a sheet consisting of a single layer containing a dielectric filler, had a large amount of protrusion when pressure was applied during dielectric heating bonding. The sheet according to Comparative Example 2, which was a sheet consisting of a single layer containing no dielectric filler, exhibited a low bonding performance to the adherends.

The invention claimed is:

1. A high-frequency dielectric heating adhesive sheet comprising:
a first adhesive layer;
a second adhesive layer; and
an intermediate layer located between the first adhesive layer and the second adhesive layer,
the first adhesive layer comprising a first thermoplastic resin,
the second adhesive layer comprising a second thermoplastic resin, wherein
each of dielectric property DP1 of the first adhesive layer and dielectric property DP2 of the second adhesive layer is 0.005 or more,
dielectric property DPM of the intermediate layer is less than 0.005,
at least one of the first adhesive layer or the second adhesive layer further comprises a dielectric filler that generates heat in response to a high-frequency wave,
the dielectric filler in the at least one of the first adhesive layer or the second adhesive layer comprises at least one selected from the group consisting of zinc oxide and silicon carbide,
the dielectric property DP1, the dielectric property DP2, and the dielectric property DPM are values of dielectric property (tanδ/ε'r) of the first adhesive layer, the second adhesive layer, and the intermediate layer, respectively,
tanδ denotes a dielectric dissipation factor at 23 degrees C. and a frequency of 40.68 MHz, and
ε'r denotes a relative permittivity at 23 degrees C. and the frequency of 40.68 MHz.

2. The high-frequency dielectric heating adhesive sheet according to claim 1, wherein a thickness decrease rate between before and after application of a high-frequency wave to the high-frequency dielectric heating adhesive sheet is 50% or less.

3. The high-frequency dielectric heating adhesive sheet according to claim 1, wherein a sheet-thickness ratio Trx represented by an expression below, Expression 1, is in a range from 5 to 80, $$Trx=\{(Tx1+Tx2)/(Tx1+Tx2+Ty)\}\times100 \qquad \text{Expression 1,}$$

where
Tx1 denotes a thickness of the first adhesive layer,
Tx2 denotes a thickness of the second adhesive layer, and
Ty denotes a thickness of the intermediate layer.

4. The high-frequency dielectric heating adhesive sheet according to claim 1, wherein at least one of an MVR ratio MVRr1 represented by an expression below, Expression 2, or an MVR ratio MVRr2 represented by an expression below, Expression 3, is 0.01 or more, $$MVRr1=MVRx1/MVRy \qquad \text{Expression 2}$$

$$MVRr2=MVRx2/MVRy \qquad \text{Expression 3,}$$

where
MVRx1 denotes an MVR of the first adhesive layer at 230 degrees C.,
MVRx2 denotes an MVR of the second adhesive layer at 230 degrees C., and
MVRy denotes an MVR of the intermediate layer at 230 degrees C.

5. The high-frequency dielectric heating adhesive sheet according to claim 1, wherein MVRy denoting an MVR of the intermediate layer at 230 degrees C. is 60 cm³/10 min or less.

6. The high-frequency dielectric heating adhesive sheet according to claim 1, wherein at least one of MVRx1 denoting an MVR of the first adhesive layer at 230 degrees C. or MVRx2 denoting an MVR of the second adhesive layer at 230 degrees C. is 0.5 cm³/10 min or more.

7. The high-frequency dielectric heating adhesive sheet according to claim 1, wherein a volume content ratio of the dielectric filler in the at least one of the first adhesive layer or the second adhesive layer is in a range from 3 vol % to 60 vol %.

8. The high-frequency dielectric heating adhesive sheet according to claim 1, wherein at least one of the first thermoplastic resin or the second thermoplastic resin comprises a polyolefin resin.

9. The high-frequency dielectric heating adhesive sheet according to claim 1, wherein at least one of the first adhesive layer or the second adhesive layer is in direct contact with the intermediate layer.

10. The high-frequency dielectric heating adhesive sheet according to claim 1, wherein a PET film is stuck to the first adhesive layer or the second adhesive layer of the high-frequency dielectric heating adhesive sheet using a double-faced sticky sheet, lattice-shaped cuts reaching a sticky agent layer of the double-faced sticky sheet are made at 2-mm intervals in the first adhesive layer or the second adhesive layer, and a cross-cut test is conducted according to JIS K5600-5-6: 1999, the lattice-shaped cuts with the PET film stuck on a first adhesive layer side are made from a second adhesive layer side thereof and the lattice-shaped cuts with the PET film stuck on the second adhesive layer side are made from the first adhesive layer side thereof, and in any layer of the high-frequency dielectric heating adhesive sheet, a percentage of a number of lattices adhering to a layer in contact with that layer without separation after the cross-cut test according to JIS K5600-5-6: 1999 is 50% or more.

11. The high-frequency dielectric heating adhesive sheet according to claim 1, wherein the intermediate layer contains at least one of the first thermoplastic resin or the second thermoplastic resin.

12. The high-frequency dielectric heating adhesive sheet according to claim 1, wherein the intermediate layer contains a dielectric filler and the dielectric filler contained in the intermediate layer has a volume content ratio of more than 0 vol % and 3 vol % or less.

13. The high-frequency dielectric heating adhesive sheet according to claim 12, wherein the volume content ratio of the dielectric filler contained in the intermediate layer is smaller than a volume content ratio of the dielectric filler in the at least one of the first adhesive layer or the second adhesive layer.

* * * * *